(12) United States Patent
Jeon et al.

(10) Patent No.: US 11,703,961 B2
(45) Date of Patent: Jul. 18, 2023

(54) DISPLAY DEVICE WITH HEAT DISSIPATOR AND COIL IN THE SAME METAL SHEET LAYER

(71) Applicant: SAMSUNG DISPLAY CO., LTD., Yongin-si (KR)

(72) Inventors: Hyun Jee Jeon, Hanam-si (KR); Ga Young Kim, Hwaseong-si (KR); Young Min Park, Gwangmyeong-si (KR); Sang Hyun Lim, Cheonan-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/503,826

(22) Filed: Oct. 18, 2021

(65) Prior Publication Data
US 2022/0291760 A1 Sep. 15, 2022

(30) Foreign Application Priority Data
Mar. 15, 2021 (KR) .......................... 10-2021-0033162

(51) Int. Cl.
*G06F 3/03* (2006.01)
*G06F 3/0354* (2013.01)
*G06F 3/041* (2006.01)
*H02J 50/10* (2016.01)
*H02J 7/00* (2006.01)
*G06F 3/044* (2006.01)

(52) U.S. Cl.
CPC ........ *G06F 3/03545* (2013.01); *G06F 3/0412* (2013.01); *G06F 3/0445* (2019.05); *H02J 7/0042* (2013.01); *H02J 50/10* (2016.02)

(58) Field of Classification Search
CPC ... G06F 3/03545; G06F 3/0412; G06F 3/0445
See application file for complete search history.

(56) References Cited

U.S. PATENT DOCUMENTS

| 9,678,604 B2 | 6/2017 | Lee | |
|---|---|---|---|
| 2012/0309310 A1* | 12/2012 | Greuet | H04B 5/0031 455/41.1 |
| 2017/0139525 A1* | 5/2017 | Jo | G06F 3/0448 |
| 2019/0385787 A1* | 12/2019 | Ichikawa | H02J 50/10 |
| 2021/0028649 A1* | 1/2021 | Ren | H01L 27/3276 |

* cited by examiner

*Primary Examiner* — Liliana Cerullo
(74) *Attorney, Agent, or Firm* — F. Chau & Associates, LLC

(57) ABSTRACT

A display device including: a display panel including an active area for displaying an image and a non-active area adjacent to the active area; and a metal sheet layer on the display panel, wherein the metal sheet layer includes: a heat dissipator overlapping the active area; and a coil surrounding the heat dissipator and overlapping the non-active area.

21 Claims, 16 Drawing Sheets

DISPLAY DEVICE WITH HEAT DISSIPATOR AND COIL IN THE SAME METAL SHEET LAYER

CROSS-REFERENCE TO RELATED APPLICATION

This application claims priority under 35 U.S.C. § 119 to Korean Patent Application No. 10-2021-0033162 filed on Mar. 15, 2021, in the Korean Intellectual Property Office, the disclosure of which is incorporated by reference herein in its entirety.

1. TECHNICAL FIELD

The present disclosure relates to a display device.

2. DESCRIPTION OF THE RELATED ART

A display device is an output device for presentation of information in visual form. Display devices have been increasingly used with the development of multimedia technology. Accordingly, various types of display devices such as a liquid crystal display (LCD) device, an organic light emitting display (OLED) device and the like have been used.

Display devices may include a touch screen to support touch input from a part of a user's body (e.g., a finger) and touch input from an electronic pen such as an electromagnetic resonance (EMR) pen or the like. The touch input using the electronic pen may permit the display device to detect the touch input more accurately than the touch input using only a part of a user's body.

SUMMARY

Embodiments of the present disclosure provide a display device that does not require a separate member for charging an electronic pen, such as a charging coil sheet or the like, has a thin thickness, and is capable of reducing a manufacturing cost.

According to an embodiment of the present disclosure, there is provided a display device including: a display panel including an active area for displaying an image and a non-active area adjacent to the active area; and a metal sheet layer on the display panel, wherein the metal sheet layer includes: a heat dissipator overlapping the active area; and a coil surrounding the heat dissipator and overlapping the non-active area.

The display device may further include: a printed circuit board connected to the display panel; and a touch driver mounted on the printed circuit board.

The touch driver may be electrically connected to the coil.

The display device may further include a conductive adhesive part interposed between the printed circuit board and the display panel and electrically connecting the touch driver to the coil.

The printed circuit board may include: a base part; and a via electrode penetrating the base part and electrically connecting the conductive adhesive part to the touch driver.

The printed circuit board may include: a base part; a touch driver connection electrode on the base part; and a connection line electrically connecting the touch driver to the coil.

The connection line may bypass an edge of the base part.

The touch driver may be configured to detect an input from an electronic pen.

The touch driver may include a first touch conductive layer and a second touch conductive layer disposed on the first touch conductive layer, and the touch driver may be configured to detect an input from an electronic pen based on an induced current induced in the first touch conductive layer or the second touch conductive layer.

The touch driver may be configured to charge the electronic pen.

The coil may include: an extension portion disposed along a boundary of the heat dissipator; a first coil electrode disposed at a first end of the extension portion; and a second coil electrode disposed at a second end of the extension portion.

The first coil electrode and the second coil electrode may overlap the printed circuit board.

The first coil electrode and the second coil electrode may be disposed at a corner of the metal sheet layer.

The display device may further include a first heat dissipation layer and a second heat dissipation layer disposed between the display panel and the metal sheet layer.

The first heat dissipation layer may include polyimide or polyethylene terephthalate.

The second heat dissipation layer may include graphite.

The display device may further include a buffer layer disposed between the display panel and the first heat dissipation layer.

According to an embodiment of the present disclosure, there is provided a display device including: a display panel; a printed circuit board connected to the display panel and including a touch driver; and a heat dissipation part disposed on the display panel, wherein the heat dissipation part includes: a heat dissipation unit; and a coil unit that surrounds the heat dissipation unit and is electrically connected to the touch driver.

The display device may further include a conductive adhesive part interposed between the printed circuit board and the display panel and electrically connecting the touch driver to the coil unit.

The printed circuit board may include: a base part; a touch driver connection electrode disposed on the base part; and a connection line electrically connecting the touch driver to the coil unit.

According to an embodiment of the present disclosure, there is provided a display device including: a display panel including a first area for displaying an image and a second area that does not display an image, wherein the second area is adjacent to at least one side of the first area; a heat dissipator disposed in the first area; and a charging strip disposed in the second area and adjacent to at least one side of the heat dissipator.

The heat dissipator and the charging strip may be provided in the same layer.

The charging strip may be configured to charge an external device.

The charging strip may include an electrode electrically connected to a touch driver of the display device.

A gap may be provided between the heat dissipator and the charging strip.

BRIEF DESCRIPTION OF THE DRAWINGS

The above and other features of the present disclosure will become more apparent by describing in detail embodiments thereof with reference to the attached drawings, in which.

DETAILED DESCRIPTION OF THE EMBODIMENTS

Figure 1:
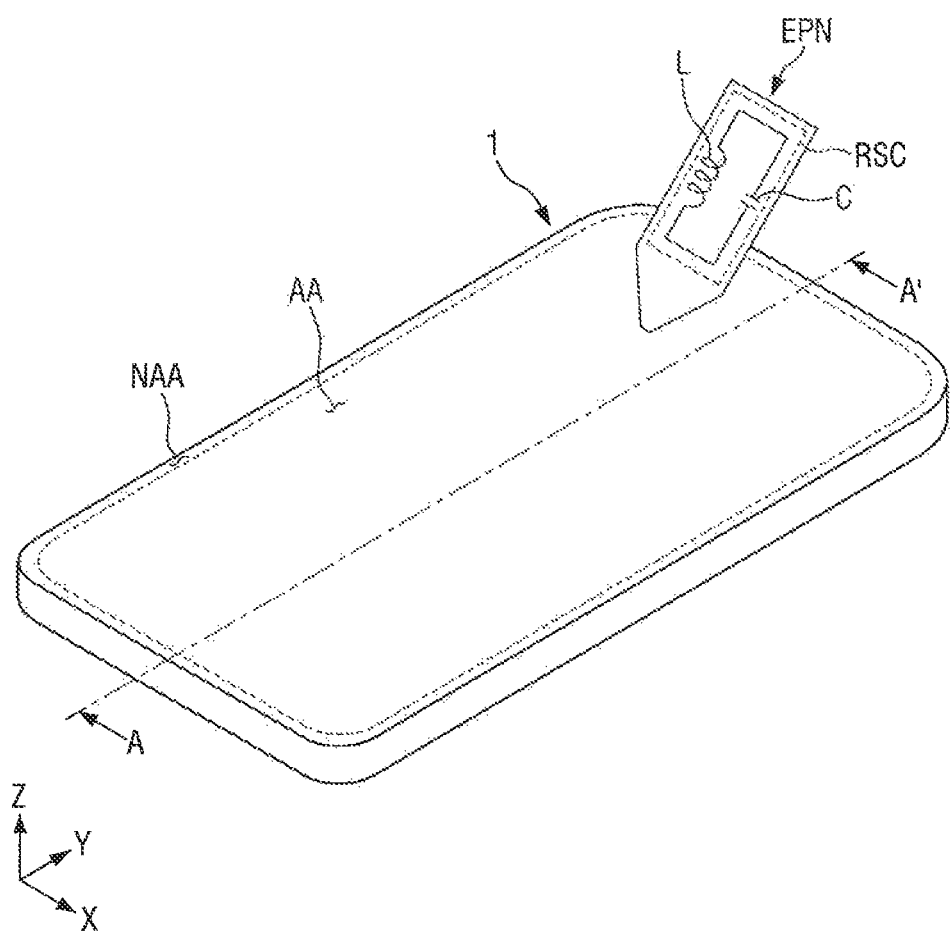
FIG. 1 is a perspective view of a display device according to an embodiment of the present disclosure.

In the following description, numerous details are set forth to provide a thorough understanding of various embodiments or implementations of the disclosure. As used herein "embodiments" and "implementations" are interchangeable words that are non-limiting examples of devices or methods employing one or more of the implementations or embodiments disclosed herein. It is apparent, however, that various embodiments may be practiced without these details or with one or more equivalent arrangements. In other instances, structures and devices may be shown in block diagram form to avoid unnecessarily obscuring various embodiments. Further, various embodiments may be different, but do not have to be exclusive. For example, shapes, configurations, and characteristics of an embodiment may be used or implemented in another embodiment of the disclosure.

Unless otherwise specified, the illustrated embodiments are to be understood as providing features of varying detail of some or a number of ways in which the disclosure may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged.

The use of cross-hatching and/or shading in the accompanying drawings is provided to clarify boundaries between adjacent elements. As such, neither the presence nor the absence of cross-hatching or shading conveys or indicates any preference or requirement for materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a process order may be performed differently from the described order. For example, two consecutively described processes may be performed substantially at the same time or performed in an order opposite to the described order. In addition, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. The term "connected" may refer to physical, electrical, and/or fluid connection, with or without intervening elements. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be substantially perpendicular to one another, or may represent different directions that may not be perpendicular to one another. Herein, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

The terms "and" and "or" may be used in the conjunctive or disjunctive sense and may be understood to be equivalent to "and/or."

Although the terms "first," "second," etc. may be used herein to describe various types of elements, these elements should not be limited by these terms. These terms are used to distinguish one element from another element. Thus, a first element discussed below could be termed a second element.

Spatially relative terms, such as "beneath," "below," "under," "lower," "above," "upper," "over," "higher," "side" (for example, as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (for example, rotated 90 degrees or about 90 degrees or at other orientations), and, as such, the spatially relative descriptors used herein may be interpreted accordingly.

The terms "overlap" or "overlapped" may mean that a first object is above or below or to a side of a second object, and vice versa. Additionally, the term "overlap" may include a layer, stack, face or facing, extending over, covering, or partly covering.

When an element is described as 'not overlapping' or 'to not overlap' another element, this may include that the elements are spaced apart from each other, offset from each other, or set aside from each other.

The terms "face" and "facing" may mean that a first element directly or indirectly opposes a second element. In a case in which a third element intervenes between the first and second element, the first and second element may be understood as being indirectly opposed to one another, although still facing each other.

The terminology used herein is for the purpose of describing embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," "has," and/or "having," and/or variations thereof when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

For example, "about" or "approximately" as used herein is inclusive of the stated value and may mean within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations, or within ±30%, 20%, 10%, 5% of the stated value.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not intended to be limiting.

Some or a number of embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (for example, microcode) to perform various functions discussed herein and may optionally be driven by firmware and/or software. It is also contemplated that each block, unit, and/or module may be implemented by dedicated hardware, or as a combination of dedicated hardware to perform some or a number of functions and a processor (for example, one or more programmed microprocessors and associated circuitry) to perform other functions. In addition, each block, unit, and/or module of some or a number of embodiments may be physically separated into two or more interacting and discrete blocks, units, and/or modules. Further, the blocks, units, and/or modules of some or a number of embodiments may be physically combined into more complex blocks, units, and/or modules.

Unless otherwise defined, all terms (including technical and scientific terms) used herein have the same meaning as commonly understood by one of ordinary skill in the art to which this disclosure pertains. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
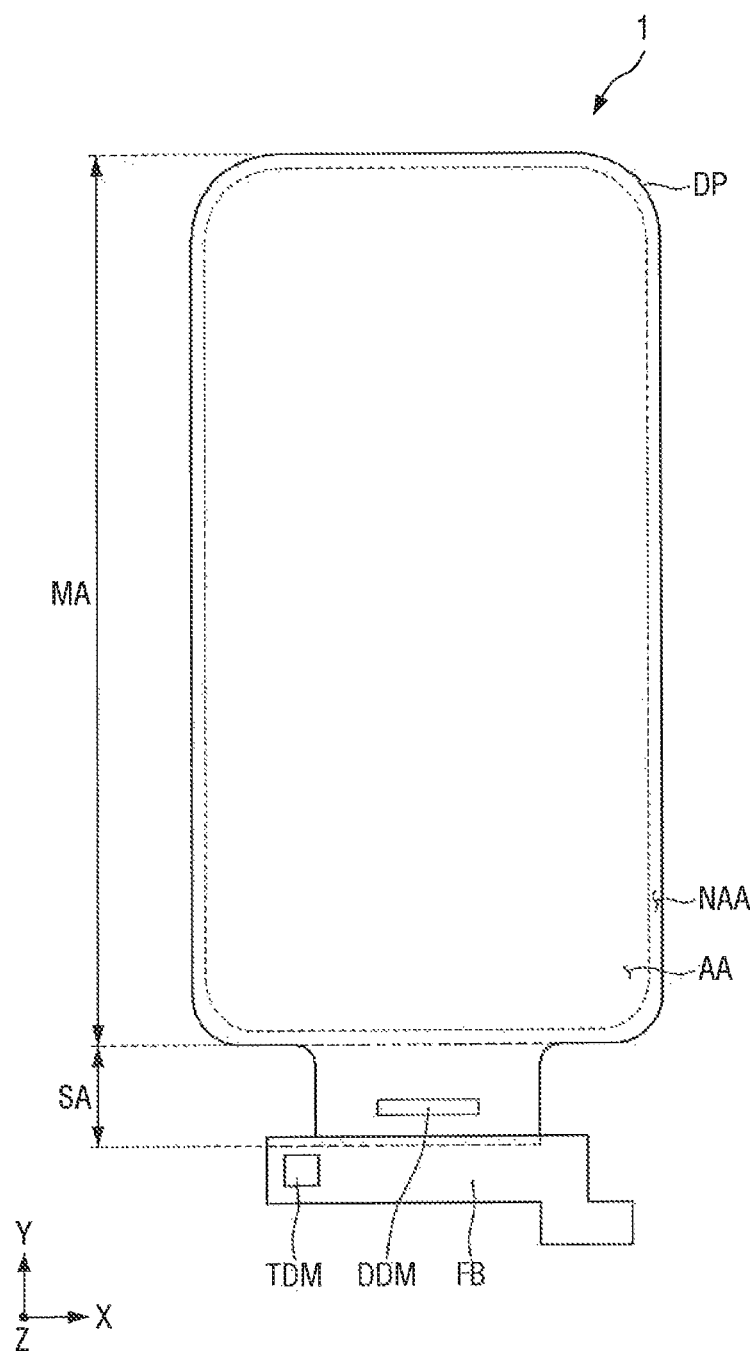
FIG. 2 is a plan view of a display panel according to an embodiment of the present disclosure.
Figure 3:
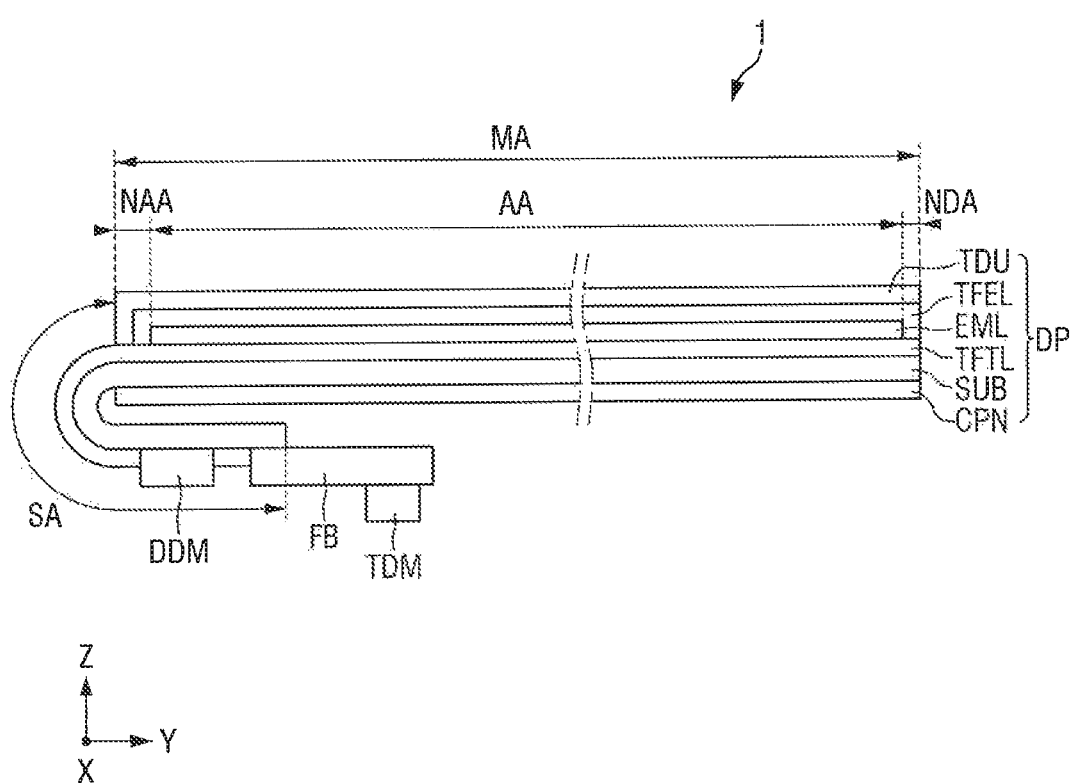
FIG. 3 is a cross-sectional view taken along line A-A' of FIG. 1.

FIG. 1 is a perspective view of a display device according to an embodiment of the present disclosure. FIG. 2 is a plan view of a display panel according to an embodiment of the present disclosure. FIG. 3 is a cross-sectional view taken along line A-A' of FIG. 1.

Hereinafter, a first direction X, a second direction Y and a third direction Z cross each other in different directions. For example, the first direction X is a width direction, the second direction Y is a length direction, and the third direction Z is a thickness direction and/or a height direction. However, the above-described directions are not limited to the above-described examples.

Referring to FIG. 1, a display device 1 is a device for displaying a moving image or a still image. The display device 1 may be used as a display screen of various electronic products such as televisions, laptop computers, monitors, billboards and the Internet of Things as well as portable electronic devices such as mobile phones, smart phones, tablet personal computers (tablet PCs), smart watches, watch phones, mobile communication terminals, electronic notebooks, electronic books, portable multimedia players (PMPs), navigation systems and ultra mobile PCs (UMPCs).

The display device 1 may have a substantially rectangular shape having both short sides in the first direction X and both long sides in the second direction Y in a plan view, but the present disclosure is not limited thereto. The display device 1 may have various planar shapes such as a polygon, a circle, and an ellipse, or the like. The display device 1 may have rounded or curved edges extending along the first and/or second directions X and Y.

The display device 1 includes an active area AA and a non-active area NAA.

The active area AA may display an image. The active area AA may detect an input for recognizing a user's touch input, a fingerprint pattern, a pen input, or the like. The active area AA may include a plurality of pixels for displaying an image and a plurality of sensors for detecting an input. In other words, in one embodiment of the present disclosure, the active area AA may be a region for displaying an image and recognizing a user's touch input, a fingerprint pattern, a pen input, or the like. However, the present disclosure is not limited thereto, and the active area AA may be divided into a display area (e.g., a first area) for displaying an image and an input detection area (e.g., a second area) for detecting an input for recognizing a user's touch input, a fingerprint pattern, a pen input, or the like.

The active area AA may be located on at least one surface of the display device 1. In one embodiment of the present disclosure, the active area AA may have a substantially rectangular shape in a plan view and may be disposed to be flat on the top surface of the display device 1, but the present disclosure is not limited thereto. The active area AA may be further disposed at the edge or the side surfaces of the display device 1, or at least a part of the active area AA may be bent.

The non-active area NAA may not display an image. The non-active area NAA may not detect an input for recognizing a user's touch input, a fingerprint pattern, a pen input, or the like. The non-active area NAA may be regions other than the active area AA.

The non-active area NAA may be disposed around the active area AA. The non-active area NAA may surround at least a part of the active area AA. For example, the non-active area NAA may be adjacent to at least one side of the active area AA. In one embodiment of the present disclosure, the non-active area NAA may have a band shape surrounding the edge of the active area AA, but the present disclosure is not limited thereto.

As described above, the active area AA may recognize a pen input. The pen input may be performed by an electronic pen EPN. The electronic pen EPN may be an electromagnetic resonance (EMR) pen that detects resonance caused by electromagnetic induction generated between the display device 1 and the pen to determine a signal.

The electronic pen EPN may include at least one resonant circuit RSC. The resonant circuit RSC may include a capacitor C and an inductor L. Although one capacitor C and one inductor L are illustrated in FIG. 1 for simplicity of description, the number of the capacitors C and the number of the inductors L are not limited thereto, and the configuration of the resonant circuit RSC may vary. For example, more than one inductor L and more than one capacitor C may be included in the electronic pen EPN. Similarly to a wireless charging principle, electromagnetic waves generated in the display device 1 resonate with the inductor L of the electronic pen EPN to supply energy to the electronic pen EPN, so that the electronic pen EPN may operate without a separate power source such as a battery or the like.

The electronic pen EPN may be provided separately from the display device 1. However, the present disclosure is not limited thereto, and the electronic pen EPN may be included in the display device 1.

Referring to FIGS. 1 to 3, the display device 1 may include a display panel DP and a printed circuit board FB.

The display panel DP may include a light emitting element. For example, the display panel DP may be an organic light emitting display panel using an organic light emitting diode including an organic light emitting layer, a micro light emitting diode display panel using a micro light emitting diode (LED), a quantum dot light emitting display panel using a quantum dot light emitting diode including a quantum dot light emitting layer, or an inorganic light emitting display panel using an inorganic light emitting element including an inorganic semiconductor. In one embodiment of the present disclosure, the display panel DP may be an organic light emitting display panel, but is not limited thereto.

The display panel DP may include a main region MA and a sub-region SA.

The main region MA may have a substantially rectangular shape in a plan view. However, the present disclosure is not limited thereto, the main region MA may have various planar shapes such as a square, a rhombus, a polygon, a circle, an ellipse, or the like.

The active area AA and the non-active area NAA may be located in the main region MA. The active area AA may be located at the center of the main region MA and may occupy most of the main region MA. The non-active area NAA may be located at the edge of the main region MA to surround the active area AA.

The sub-region SA may be located on one side of the main region MA. The sub-region SA may extend from the one side of the main region MA. In a plan view, the sub-region SA may have a width smaller than that of the main region MA and protrude from the one side of the main region MA. In one embodiment of the present disclosure, the sub-region SA may be located on the short side extending in the first direction X of the main region MA, but the present disclosure is not limited thereto. The sub-region SA may also be located on the long side extending in the second direction Y of the main region MA.

The sub-region SA may connect the printed circuit board FB to the main region MA. One side of the sub-region SA may be connected to the main region MA and the other side of the sub-region SA may be connected to the printed circuit board FB. In other words, a first side of the sub-region SA may be connected to the main region MA and a second side of the sub-region SA may be connected to the printed circuit board FB.

A display driver DDM for driving a plurality of pixels arranged in the active area AA may be mounted on the sub-region SA. The display driver DDM may include a display driving integrated circuit. The sub-region SA may be replaced with a flexible circuit film. In other words, the display driver DDM may be mounted on the display device 1 by various methods such as a chip on plastic (COP) method, a chip on film (COF) method, a chip on glass (COG) method, or the like.

The printed circuit board FB may be attached to the other side of the sub-region SA. The printed circuit board FB may be a flexible circuit board. A touch driver TDM for driving a touch sensing unit TDU to be described later may be mounted on the printed circuit board FB.

As shown in FIG. 3, the sub-region SA may be bent downward in a cross-sectional view. In this case, at least a part of the sub-region SA, the printed circuit board FB, the display driver DDM, and the touch driver TDM may overlap the main region MA in the thickness direction (e.g., the third direction Z).

The display panel DP may include a substrate SUB, a thin film transistor layer TFTL, a light emitting element layer EML, an encapsulation layer TFEL, and the touch sensing unit TDU.

The substrate SUB may be disposed in the main region MA and the sub-region SA. The substrate SUB may be formed of an insulating material such as glass, quartz, or a polymer resin. Examples of a polymer material may include polyethersulphone (PES), polyacrylate (PA), polyarylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CAT), cellulose acetate propionate (CAP), or a combination thereof. Alternatively, the substrate SUB may include a metal material. In one embodiment of the present disclosure, the substrate SUB may be a flexible substrate that contains polyimide and may be bent, folded, or rolled. However, the present disclosure is not limited thereto, and the substrate SUB may be a rigid substrate.

Figure 4:
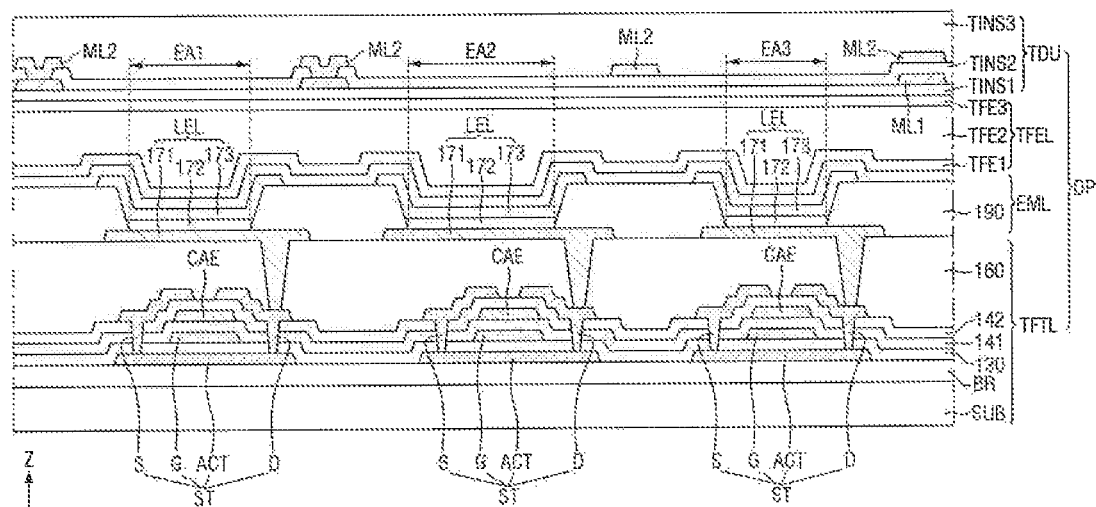
FIG. 4 is a cross-sectional view of a display panel according to an embodiment of the present disclosure.

The thin film transistor layer TFTL may be disposed on one surface of the substrate SUB, e.g., on the top surface of the substrate SUB in FIG. 4. The thin film transistor layer TFTL may be disposed in the active area AA and the non-active area NAA. The thin film transistor layer TFTL may include a thin film transistor ST as shown in FIG. 4 for driving pixels in the active area AA. The thin film transistor layer TFTL may be disposed in the main region MA and the sub-region SA. The thin film transistor layer TFTL may further include display scan lines, display data lines, power supply lines, display scan control lines, routing lines connecting display pads to the display data lines, and the like.

The light emitting element layer EML may be disposed on the thin film transistor layer TFTL. The light emitting element layer EML may be disposed in the active area AA. The light emitting element layer EML may include light emitting elements arranged in light emitting units.

The encapsulation layer TFEL may be disposed on the light emitting element layer EML. The encapsulation layer TFEL may cover opposite sides of the light emitting element layer EML. The encapsulation layer TFEL may be arranged in the display area DA and a non-display area NDA of the main region MA. The encapsulation layer TFEL may include at least one inorganic layer and at least one organic layer for encapsulating the light emitting element layer.

The touch sensing unit TDU may be disposed on the encapsulation layer TFEL. The touch sensing unit TDU may be disposed in the display area DA and the non-display area NDA of the main region MA. The touch sensing unit TDU may detect a touch of a person or an object. As will be described later, the touch sensing unit TDU may further detect an input from the electronic pen EPN based on the induced current induced in the touch sensing unit TDU by the inductor L of the electronic pen EPN, but the present disclosure is not limited thereto.

FIG. 4 is a cross-sectional view of a display panel according to an embodiment of the present disclosure.

Referring to FIGS. 3 and 4, the display panel DP may further include a barrier layer BR.

The barrier layer BR may be disposed on the top surface of the substrate SUB. The barrier layer BR may block moisture permeating through the substrate SUB that is susceptible to moisture permeation. The barrier layer BR may be formed as a plurality of inorganic layers that are alternately stacked. For example, the barrier layer BR may be formed of multiple layers in which one or more inorganic layers of a silicon nitride layer, a silicon oxynitride layer, a silicon oxide layer, a titanium oxide layer and an aluminum oxide layer are alternately stacked.

An active layer ACT may be disposed on the barrier layer BR. The active layer ACT forms the channel of the thin film transistor ST. The active layer ACT may be disposed in each pixel of the display area DA, and may also be disposed in the non-display area NDA in some cases. The active layer ACT may include polycrystalline silicon, monocrystalline silicon, low-temperature polycrystalline silicon, amorphous silicon, or an oxide semiconductor.

A gate insulating layer 130 may be disposed on the active layer ACT. The gate insulating layer 130 may be disposed over the entire substrate SUB. The gate insulating layer 130 may include a silicon compound, a metal oxide, or the like. For example, the gate insulating layer 130 may include silicon oxide, silicon nitride, silicon oxynitride, aluminum oxide, tantalum oxide, hafnium oxide, zirconium oxide, titanium oxide, or the like. These may be used alone or in combination with each other.

A gate electrode G may be disposed on the gate insulating layer 130. The gate electrode G may overlap the active layer ACT in the third direction Z. The gate electrode G may be formed as a single layer or multiple layers made of any one of molybdenum (Mo), aluminum (Al), chromium (Cr), gold (Au), titanium (Ti), nickel (Ni), neodymium (Nd) and copper (Cu) or an alloy thereof.

A first interlayer insulating layer 141 may be disposed on the gate electrode G. The first interlayer insulating layer 141 may be formed of an inorganic layer, for example, a silicon nitride layer, a silicon oxynitride layer, a silicon oxide layer, a titanium oxide layer, or an aluminum oxide layer. Although the first interlayer insulating layer 141 is illustrated as a single layer in FIG. 4, the first interlayer insulating layer 141 may also be formed of a plurality of inorganic layers.

A capacitor electrode CAE may be disposed on the first interlayer insulating layer 141. The capacitor electrode CAE may overlap the gate electrode G of the first thin film transistor ST in the third direction Z. Since the first interlayer insulating layer 141 has a predetermined dielectric constant, the capacitor electrode CAE, the gate electrode G, and the first interlayer insulating layer 141 disposed therebetween may form a capacitor. The capacitor electrode CAE may be formed as a single layer or multiple layers made of any one of molybdenum (Mo), aluminum (Al), chromium (Cr), gold (Au), titanium (Ti), nickel (Ni), neodymium (Nd) and copper (Cu) or an alloy thereof.

A second interlayer insulating layer 142 may be disposed on the capacitor electrode CAE. The second interlayer insulating layer 142 may be formed of an inorganic layer, for example, a silicon nitride layer, a silicon oxynitride layer, a silicon oxide layer, a titanium oxide layer, or an aluminum oxide layer. Although the second interlayer insulating layer 142 is illustrated as a single layer in FIG. 4, the second interlayer insulating layer 142 may also be formed of a plurality of inorganic layers.

A source electrode S and a drain electrode D may be arranged on the second interlayer insulating layer 142. The source electrode S and the drain electrode D may be connected to the active layer ACT through contact holes penetrating the first interlayer insulating layer 141 and the second interlayer insulating layer 142. The source electrode S and the drain electrode D may be formed as a single layer or multiple layers made of any one of molybdenum (Mo), aluminum (Al), chromium (Cr), gold (Au), titanium (Ti), nickel (Ni), neodymium (Nd) and copper (Cu) or an alloy thereof. In another embodiment of the present disclosure, the locations of the source electrode S and the drain electrode D may be reversed from the configuration shown in FIG. 4.

A planarization layer 160 may be disposed on the source electrode S and the drain electrode D. The planarization layer 160 may be formed of an organic layer such as acryl resin, epoxy resin, phenolic resin, polyamide resin, polyimide resin and the like. In some embodiments of the present disclosure, the planarization layer 160 may be formed of a plurality of layers, and at least one connection electrode may be further disposed between the plurality of layers to connect an anode electrode to the drain electrode D while penetrating the plurality of layers. For example, a contact hole may be formed in the planarization layer 160 to accommodate the at least one connection electrode.

Light emitting elements LEL and a bank 190 may be arranged on the planarization layer 160. Each of the light emitting elements LEL includes a pixel electrode 171, a light emitting layer 172, and a common electrode 173.

The pixel electrode 171 may be disposed on the planarization layer 160. The pixel electrode 171 may be connected to a connection electrode through a contact hole penetrating the planarization layer 160.

In a top emission structure that emits light toward the common electrode 173 with reference to the light emitting layer 172, the pixel electrode 171 may be made of a metal material having high reflectivity such as a stacked structure (Ti/Al/Ti) of aluminum and titanium, a stacked structure (ITO/Ag/ITO) of silver and indium tin oxide (ITO), a stacked structure (ITO/Al/ITO) of aluminum and ITO, an APC alloy, and a stacked structure (ITO/APC/ITO) of an APC alloy and ITO. The APC alloy is an alloy of silver (Ag), palladium (Pd) and copper (Cu).

The bank 190 may be formed to partition the pixel electrode 171 on the planarization layer 160 to define a first light emitting unit EA1, a second light emitting unit EA2, a third light emitting unit EA3, and so forth. The bank 190 may be disposed to cover the edge of the pixel electrode 171. The bank 190 may be formed of an organic layer such as acryl resin, epoxy resin, phenolic resin, polyamide resin, polyimide resin and the like. The bank 190 may be referred to as a pixel definition layer.

Each of the first light emitting unit EA1, the second light emitting unit EA2, and the third light emitting unit EA3 represents an area in which the pixel electrode 171, the light emitting layer 172, and the common electrode 173 are sequentially stacked, and holes from the pixel electrode 171 and electrons from the common electrode 173 are combined with each other in the light emitting layer 172 to emit light.

The light emitting layer 172 may be disposed on the pixel electrode 171 and the bank 190. The light emitting layer 172 may include an organic material to emit light in a predetermined color. For example, the light emitting layer 172 includes a hole transporting layer, an organic material layer, and an electron transporting layer.

The common electrode 173 may be disposed on the light emitting layer 172. The common electrode 173 may be disposed to cover the light emitting layer 172. The common electrode 173 may be a common layer that is commonly formed at the first light emitting unit EA1, the second light emitting unit EA2, and the third light emitting unit EA3. A capping layer may be formed on the common electrode 173.

In the top emission structure, the common electrode 173 may be formed of a transparent conductive material (TCO) such as ITO or IZO capable of transmitting light or a semi-transmissive conductive material such as magnesium (Mg), silver (Ag), or an alloy of magnesium (Mg) and silver (Ag). When the common electrode 173 is formed of a semi-transmissive conductive material, the light emission efficiency can be increased due to a micro-cavity effect.

The encapsulation layer TFEL may be disposed on the common electrode 173. The encapsulation layer TFEL includes at least one inorganic layer to prevent oxygen or moisture from permeating into the light emitting element layer EML. In addition, the encapsulation layer TFEL includes at least one organic layer to protect the light emitting element layer EML from foreign substances such as dust. For example, the encapsulation layer TFEL includes a first encapsulation inorganic layer TFE1, an encapsulation organic layer TFE2, and a second encapsulation inorganic layer TFE3.

The first encapsulation inorganic layer TFE1 may be disposed on the common electrode 173, the encapsulation organic layer TFE2 may be disposed on the first encapsulation inorganic layer TFE1, and the second encapsulation inorganic layer TFE3 may be disposed on the encapsulation organic layer TFE2. The first inorganic encapsulation layer TFE1 and the second inorganic encapsulation layer TFE3 may be formed of multiple layers in which one or more inorganic layers of a silicon nitride layer, a silicon oxynitride layer, a silicon oxide layer, a titanium oxide layer and an aluminum oxide layer are alternately stacked. The encapsulation organic layer TFE2 may be an organic layer such as acryl resin, epoxy resin, phenolic resin, polyamide resin, polyimide resin or the like.

The touch sensing unit TDU may be disposed on the encapsulation layer TFEL. The touch sensing unit TDU includes a first touch insulating layer TINS1, a first touch conductive layer ML1, a second touch insulating layer TINS2, a second touch conductive layer ML2, and a third touch insulating layer TINS3.

The first touch insulating layer TINS1 may be formed of an inorganic layer, for example, a silicon nitride layer, a silicon oxynitride layer, a silicon oxide layer, a titanium oxide layer, or an aluminum oxide layer.

The first touch conductive layer ML1 may be disposed on the first touch insulating layer TINS1. The first touch conductive layer ML may be formed as a single layer or multiple layers made of any one of molybdenum (Mo), aluminum (Al), chromium (Cr), gold (Au), titanium (Ti), nickel (Ni), neodymium (Nd) and copper (Cu) or an alloy thereof.

The second touch insulating layer TINS2 is disposed on the first touch conductive layer ML1. The second touch insulating layer TINS2 may be formed of an inorganic layer, for example, a silicon nitride layer, a silicon oxynitride layer, a silicon oxide layer, a titanium oxide layer, or an aluminum oxide layer. Alternatively, the second touch insulating layer TINS2 may be formed of an organic layer such as acryl resin, epoxy resin, phenolic resin, polyamide resin, polyimide resin and the like.

The second touch conductive layer ML2 may be disposed on the second touch insulating layer TINS2. The second touch conductive layer ML2 may be formed as a single layer or multiple layers made of any one of molybdenum (Mo), aluminum (Al), chromium (Cr), gold (Au), titanium (Ti), nickel (Ni), neodymium (Nd) and copper (Cu) or an alloy thereof.

The first touch conductive layer ML1 and the second touch conductive layer ML2 may be arranged without overlapping the plurality of light emitting units EA1, EA2, and EA3 in the third direction Z. A part of the second touch conductive layer ML2 may overlap the first touch conductive layer ML1 in the third direction Z. The second touch conductive layer ML2 may be connected to the first touch conductive layer ML1 through the contact hole penetrating the first touch insulating layer TINS1. In addition, at least one of the second touch conductive layers ML2 may not overlap the first conductive layer ML1 in the third direction Z.

The second touch conductive layer ML2 may include driving electrodes to which a driving signal is applied and detection electrodes for detecting the charge variation amount of the capacitance. The first touch conductive layer ML1 may perform a function of connecting the driving electrodes or the detection electrodes that are electrically separated, but the present disclosure is not limited thereto.

In one embodiment of the present disclosure, the first touch conductive layer ML1 and/or the second touch conductive layer ML2 may perform a function of sensing the input of the electronic pen EPN. For example, the input of the electronic pen EPN may be sensed based on the induced current induced in sensing electrodes of the second touch conductive layer ML2 by the magnetic field of the inductor L of the electronic pen EPN. However, the present disclosure is not limited thereto, and the display device 1 may sense the input of the electronic pen EPN using an electro-magnetic resonance (EMR) sensor provided separately from the touch sensing unit TDU.

The third touch insulating layer TINS3 is formed on the second touch conductive layer ML2. The third touch insulating layer TINS3 may flatten the stepped portions formed by driving electrodes, detection electrodes, and the first touch conductive layer ML1. The third touch insulating layer TINS3 may be formed of an organic layer such as acryl resin, epoxy resin, phenolic resin, polyamide resin, polyimide resin and the like.

Figure 5:
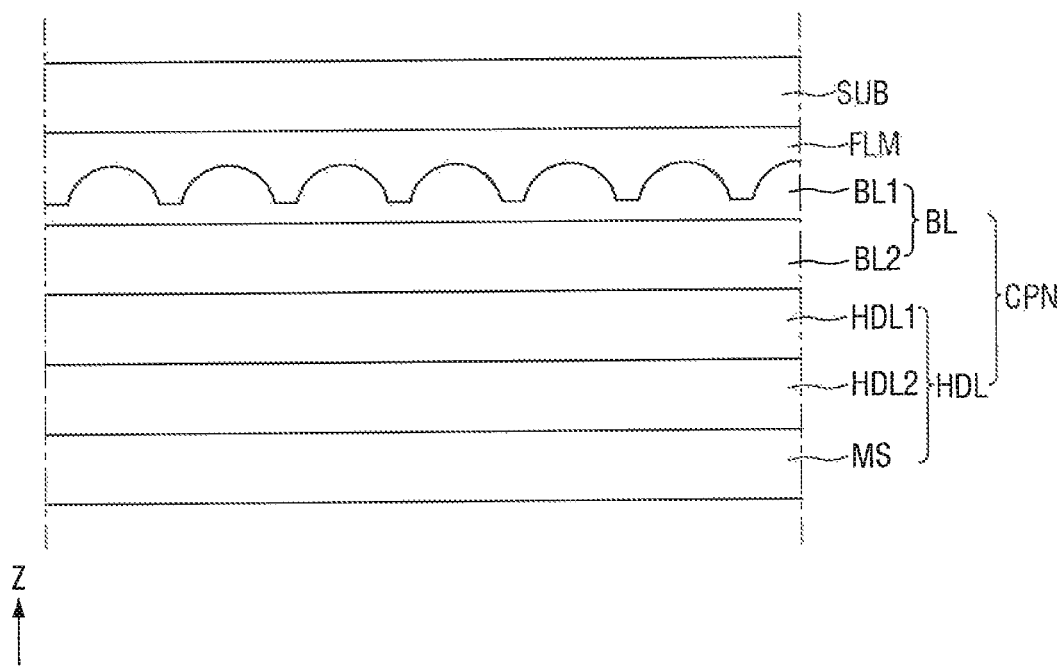
FIG. 5 is a cross-sectional view of a cover panel according to an embodiment of the present disclosure.

FIG. 5 is a cross-sectional view of a cover panel according to an embodiment of the present disclosure.

Referring to FIGS. 1 to 5, a cover panel CPN may be disposed on the other surface of the substrate SUB, e.g., on the bottom surface of the substrate SUB in FIG. 4. The cover panel CPN may include a plurality of functional layers for impact absorption, electromagnetic wave shielding, heat dissipation, and the like.

The cover panel CPN may include a buffer layer BL and a heat dissipation layer HDL.

The buffer layer BL may be disposed on the other surface of the substrate SUB. The buffer layer BL may absorb an external impact. The buffer layer BL may contain a light blocking material to prevent the structure disposed above the buffer layer BL from being visually recognized, but the present disclosure is not limited thereto.

The buffer layer BL may include a first buffer layer BL1 and a second buffer layer BL2 that are sequentially stacked on the substrate SUB.

The first buffer layer BL1 may be disposed on the other surface of the substrate SUB. The first buffer layer BL1 may be an embossed layer. An uneven structure may be formed by performing an embossing process on one surface of the first buffer layer BL1 facing the other surface of the substrate SUB, e.g., the top surface of the first buffer layer BL1 in FIG. 5. The uneven structure may have a semicircular or semi-elliptical cross-sectional shape, but the cross-sectional shape of the uneven structure is not limited thereto.

The first buffer layer BL1 may be made of a polymer resin such as polyurethane, polycarbonate, polypropylene, polyethylene, or the like, or may contain an elastic material such as rubber, silicone, sponge in which a urethane-based material or an acrylic-based material is foam-molded, or the like. However, the present disclosure is not limited thereto.

The second buffer layer BL2 may be disposed on the other surface of the first buffer layer BL1, e.g., on the bottom surface of the first buffer layer BL1 in FIG. 5. The second buffer layer BL2 may be a cushion layer.

The second buffer layer BL2 may be made of a polymer resin such as polyurethane, polycarbonate, polypropylene, polyethylene, or the like, or may contain an elastic material such as rubber, silicone, sponge in which a urethane-based material or an acrylic-based material is foam-molded, or the like. However, the present disclosure is not limited thereto.

The buffer layer BL may further include a planarization layer FLM interposed between the substrate SUB and the embossed layer. The planarization layer FLM may also be separate from the buffer layer BL. The planarization layer FLM may be an adhesive layer that bonds the embossed layer and the substrate SUB, but the present disclosure is not limited thereto. The planarization layer FLM may be provided between the first buffer layer BL and the substrate SUB.

The buffer layer BL may further perform the function of blocking external light. For example, at least one of the first buffer layer BL1 and the second buffer layer BL2 may contain a light absorbing material such as a black pigment, a black dye, or the like to prevent components arranged under the buffer layer BL from being visually recognized. However, the present disclosure is not limited thereto.

At least one of the first buffer layer BL1, the second buffer layer BL2, or the planarization layer FLM may be omitted. The buffer layer BL may also be a single layer.

The heat dissipation layer HDL may be disposed on the buffer layer BL. For example, the heat dissipation layer HDL may be disposed on the second buffer layer BL2. The heat dissipation layer HDL may diffuse heat generated in the display panel DP or other parts of the display device 1.

The heat dissipation layer HDL may include a first heat dissipation layer HDL1, a second heat dissipation layer HDL2, and a metal sheet layer MS that are sequentially stacked on the second buffer layer BL2.

The first heat dissipation layer HDL1 may include a polymer film. For example, the first heat dissipation layer HDL1 may include, for example, polyimide (PI), polyethylene terephthalate (PET), polycarbonate (PC), polyethylene (PE), polypropylene (PP), polysulfone (PSF), polymethylmethacrylate (PMMA), triacetylcellulose (TAC), cycloolefin polymer (COP) or the like, but is not limited thereto.

The second heat dissipation layer HDL2 may be disposed on the first heat dissipation layer HDL1. The second heat dissipation layer HDL2 may include a material having excellent thermal conductivity, e.g., graphite or carbon nanotubes, but the present disclosure is not limited thereto.

At least one of the first heat dissipation layer HDL1 or the second heat dissipation layer HDL2 may be omitted.

The metal sheet layer MS may be disposed on the second heat dissipation layer HDL2. The metal sheet layer MS may include a metal. For example, the metal may include copper, nickel, ferrite, silver, or the like having excellent thermal conductivity, but the present disclosure is not limited thereto. The metal sheet layer MS may perform not only a heat dissipation function but also an electromagnetic wave shielding function. Further, as will be described later, the metal sheet layer MS may include a coil unit CLP to further perform a function of charging the electronic pen EPN. The metal sheet layer MS may be a third heat dissipation layer.

The cover panel CPN may further include at least one bonding member interposed between the plurality of layers constituting the cover panel CPN. For example, a bonding member may be provided between the heat dissipation layer HDL and the buffer layer BL. If the touch sensing unit TDU does not perform the function of sensing the input of the electronic pen EPN, the cover panel CPN may further include a digitizer layer including an electro-magnetic resonance (EMR) sensor for sensing the input of the electronic pen EPN. For example, the digitizer layer may be interposed between the first heat dissipation layer HDL1 and the second heat dissipation layer HDL2, or between the second heat dissipation layer HDL2 and the metal sheet layer MS. However, the arrangement of the digitizer layer is not limited thereto.

Figure 6:
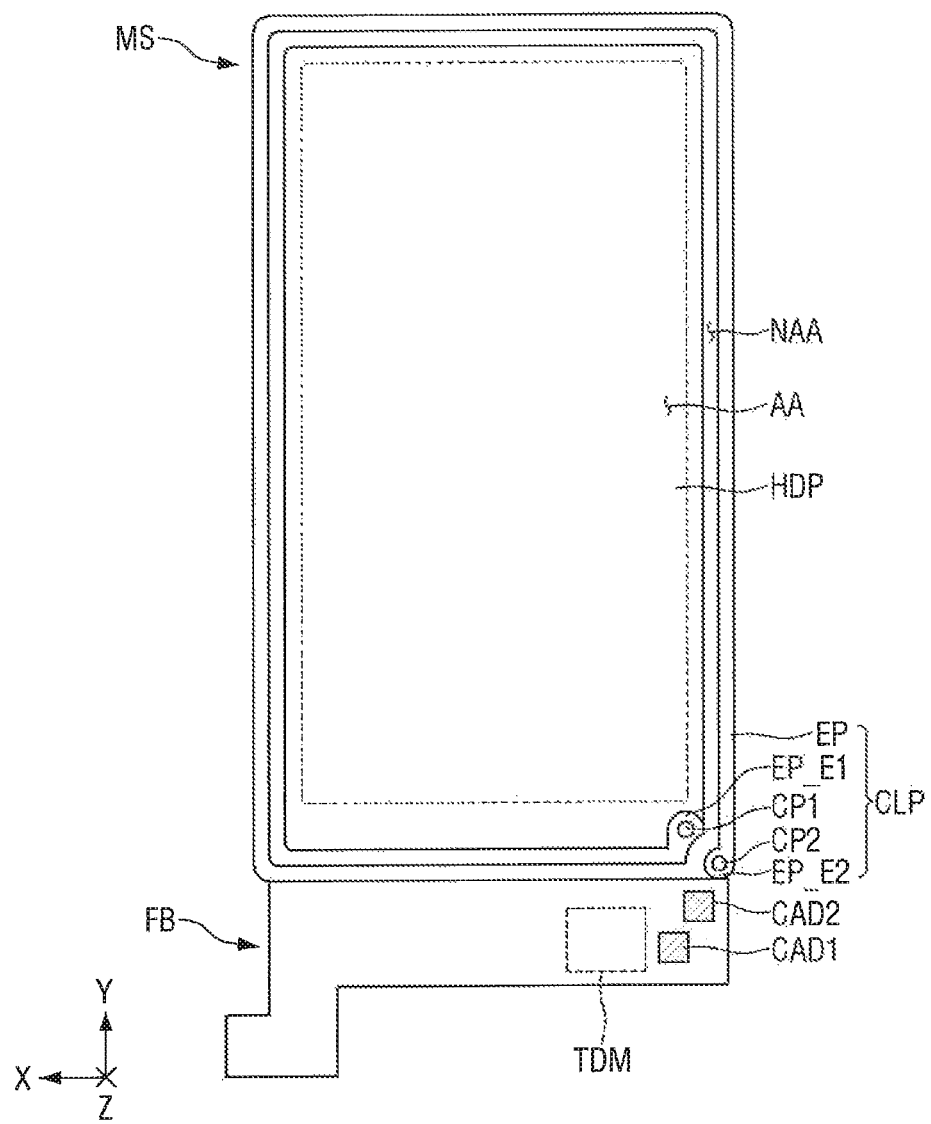
FIG. 6 is a plan view of a metal sheet layer and a printed circuit board according to an embodiment of the present disclosure in which the printed circuit board is unfolded.
Figure 7:
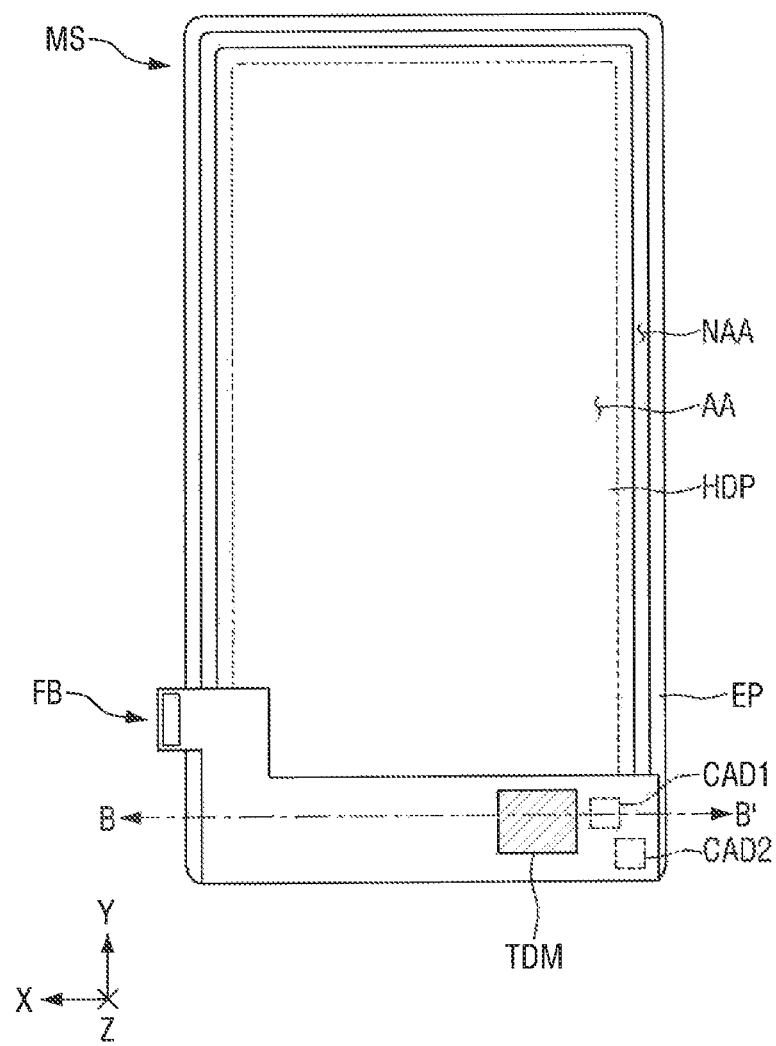
FIG. 7 is a plan view of the metal sheet layer and the printed circuit board according to an embodiment of the present disclosure in which the printed circuit board overlaps the metal sheet layer.
Figure 8:
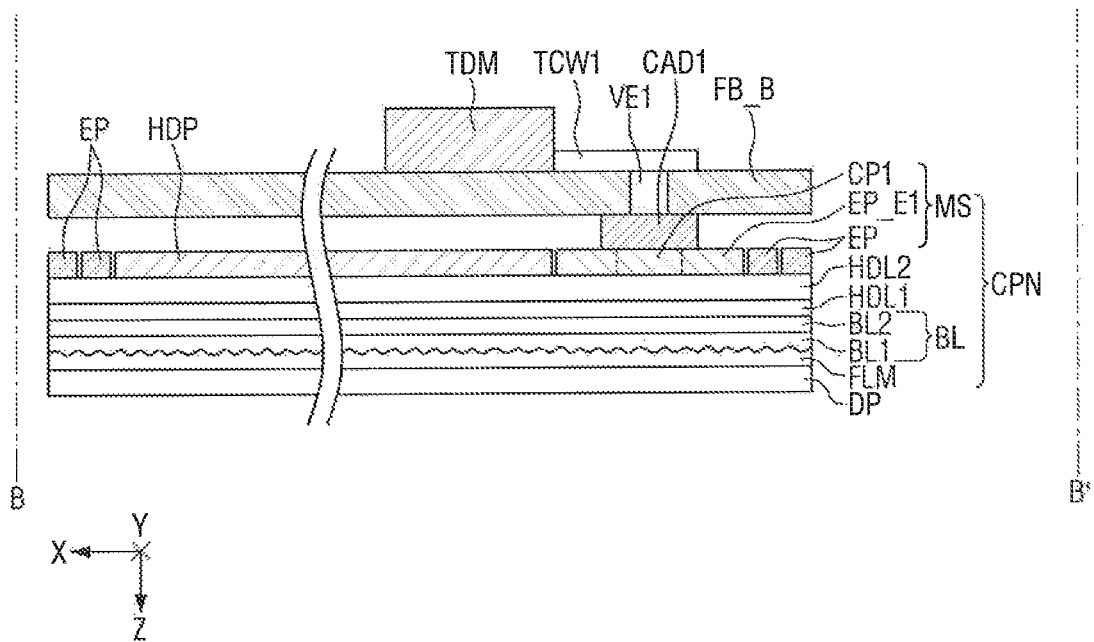
FIG. 8 is a cross-sectional view taken along line B-B' of FIG. 7.

FIG. 6 is a plan view of a metal sheet layer and a printed circuit board according to an embodiment of the present disclosure in which the printed circuit board is unfolded. FIG. 7 is a plan view of the metal sheet layer and the printed circuit board according to an embodiment of the present disclosure in which the printed circuit board overlaps the metal sheet layer. FIG. 8 is a cross-sectional view taken along line B-B' of FIG. 7.

In FIGS. 6 to 8, the metal sheet layer MS and the printed circuit board FB are illustrated upside down. FIGS. 6 and 7 show the bottom surface of the metal sheet layer MS and the bottom surface of the printed circuit board FB.

When the metal sheet layer MS and the printed circuit board FB are unfolded to be flat on the plane, the bottom surface of the metal sheet layer MS and the bottom surface of the printed circuit board FB may be the opposite surfaces of the top surface of the metal sheet layer MS and the top surface of the printed circuit board FB that are located in the third direction Z, respectively. The third direction Z may be a direction in which an image is displayed and/or a direction in which the light of the light emitting elements LEL is mainly emitted. The bottom surface of the printed circuit board FB may be the bottom surface of a base part FB_B to be described later.

Referring to FIGS. 6 and 7, the metal sheet layer MS may have a substantially rectangular shape in a plan view. Referring further to FIG. 2, in one embodiment of the present disclosure, the metal sheet layer MS may have substantially the same planar shape as that of the main region MA of the display panel DP. In this case, the edge of the metal sheet layer MS may be aligned to overlap the edge of the main region MA. However, the shape of the metal sheet layer MS is not limited thereto, and the metal sheet layer MS may have various planar shapes such as a polygon, a circle, an ellipse, or the like.

Referring to FIG. 6, when the printed circuit board FB is unfolded to be flat on the plane, the printed circuit board FB may be located adjacent to the short side of the metal sheet layer MS that extends in the first direction X. However, the present disclosure is not limited thereto, and the printed circuit board FB may be located adjacent to the long side of the metal sheet layer MS that extends in the second direction Y. Referring to FIGS. 3 and 7, when the sub-region SA of the display panel DP is bent, the printed circuit board FB may overlap the short side of the metal sheet layer MS and portions adjacent thereto in the third direction Z. In this case, the display driver DDM and touch driver TDM may overlap the short side of the metal sheet layer MS and portions adjacent thereto in the third direction Z.

Referring to FIGS. 6 to 8, the metal sheet layer MS may include a heat dissipation unit HDP and the coil unit CLP. The heat dissipation unit HDP may be referred to as a heat dissipator, which may be used to dissipate heat from the display device 1. The coil unit CLP may be referred to as a coil or a charging strip.

The heat dissipation unit HDP may form the central portion of the metal sheet layer MS. The heat dissipation unit HDP may have a substantially rectangular shape with rounded corners in a plan view and may have a larger area than that of the coil unit CLP, but the shape of the heat dissipation unit HDP is not limited thereto.

Referring further to FIG. 2, the heat dissipation unit HDP may have substantially the same area as that of the active area AA in a plan view, and most of the heat dissipation unit HDP may overlap the active area AA in the thickness direction. Accordingly, heat may be effectively emitted from the active area AA. In one embodiment of the present disclosure, the heat dissipation unit HDP may have a larger area than that of the active area AA in a plan view, and the active area AA may be located within the heat dissipation unit HDP. In this case, the boundary of the heat dissipation unit HDP and the edge of the active area AA adjacent thereto may be located within the non-active area NAA. However, the present disclosure is not limited thereto. The heat dissipation unit HDP and the active area AA may have substantially the same area in a plan view, and the boundary of the heat dissipation unit HDP may overlap the boundary of the active area AA, or the heat dissipation unit HDP may be located within the active area AA.

The coil unit CLP may be disposed to surround the heat dissipation unit HDP in a plan view. Referring further to FIG. 2, the coil unit CLP may be disposed to overlap the non-active area NAA. For example, the coil unit CLP may be disposed along an edge of the non-active area NAA. The coil unit CLP may have a planar shape that is substantially the same as or similar to that of the non-active area NAA. In one embodiment of the present disclosure, the coil unit CLP may have a smaller width than that of the non-active area NAA and be located within the non-active area NAA, but the present disclosure is not limited thereto. For example, the coil unit CLP may have substantially the same width and/or area as that of the non-active area NAA, and the boundary of the coil unit CLP may overlap the boundary of the non-active area NAA in a plan view. The coil unit CLP may have a larger width than that of the non-active area NAA in a plan view, and a part of the coil unit CLP may overlap the active area AA.

The heat dissipation unit HDP and the coil unit CLP may be integrally formed on the same layer, e.g., the metal sheet layer MS.

The coil unit CLP may be disposed to be wound around the heat dissipation unit HDP at least once in a plan view. In one embodiment of the present disclosure, the coil unit CLP is disposed to be wound around the heat dissipation unit HDP twice, but the number of turns of the coil unit CLP is not limited thereto. In the present embodiment, one coil unit CLP is illustrated, but a plurality of coil units CLP may be arranged.

The coil unit CLP may include an extension portion EP and a first coil electrode CP1 and a second coil electrode CP2 disposed at both ends of the extension portion EP, respectively.

The extension portion EP may be disposed in a stripe shape surrounding the heat dissipation unit HDP more than once along the edge of the heat dissipation unit HDP. For example, two adjacent parts of the extension portion EP may be arranged along each side of the heat dissipation unit HDP in a plan view. In one embodiment of the present disclosure, the extension portion EP may be disposed in a band shape having straight portions extending in the first direction X and the second direction Y to correspond to the planar shape of the heat dissipation unit HDP. However, the present disclosure is not limited thereto, and the path where the extension portion EP is disposed may have various planar shapes such as a polygon, a circle, an ellipse, or the like.

The first coil electrode CP1 and the second coil electrode CP2 may be arranged at a first end EP_E1 of the extension portion EP and a second end EP_E2 of the extension portion EP, respectively. The first end EP_E1 of the extension portion EP and the second end EP_E2 of the extension portion EP may be larger than other parts of the extension portion EP in a plan view, but the present disclosure is not limited thereto. The first coil electrode CP1 and the second coil electrode CP2 may be separate members distinguished from the coil unit CLP, or may be specific portions of the coil unit CLP.

The first end EP_E1 of the extension portion EP, the second end EP_E2 of the extension portion EP, the first coil electrode CP1, and the second coil electrode CP2 may be arranged at the corner portion of the heat dissipation layer HDL. The corner portion of the heat dissipation layer HDL may be formed at a portion where the short side in the first direction X and the long side in the second direction Y meet. However, the present disclosure is not limited thereto, and the first end EP_E1 of the extension portion EP, the second end EP_E2 of the extension portion EP, the first coil electrode CP1, and the second coil electrode CP2 may be arranged adjacent to the short side or the long side of the heat dissipation layer HDL disposed between the corner portions. As shown in FIG. 6, in one embodiment of the present disclosure, the first end EP_E1 of the extension portion EP, the second end EP_E2 of the extension portion EP, the first coil electrode CP1, and the second coil electrode CP2 may be arranged at the corner portion adjacent to the touch driver TDM, e.g., the lower right corner portion of FIGS. 6 and 7, between both corner portions overlapping the printed circuit board FB in the third direction Z. In other words, the first end EP_E1 of the extension portion EP, the second end EP_E2 of the extension portion EP, the first coil electrode CP1, and the second coil electrode CP2 may be arranged at the same corner portion.

Referring to FIG. 8, the extension portion EP may be disposed such that different portions adjacent to each other are separated from each other in a cross-sectional view. The extension portion EP may form a gap between different portions adjacent to each other in a cross-sectional view. In some embodiments of the present disclosure, the gap may be filled with an insulating material, but the present disclosure is not limited thereto.

The first end EP_E1 of the extension portion EP may be disposed to be separated from another part of the extension portion EP adjacent thereto in a cross-sectional view. A gap may be formed between the first end EP_E1 of the extension portion EP and the other parts of the extension portion EP adjacent thereto in a cross-sectional view. The gap may be overlapped by the base part FB_B. In some embodiments of the present disclosure, the gap may be filled with an insulating material, but the present disclosure is not limited thereto. Similarly, the second end EP_E2 of the extension portion EP may also be disposed to be separated from other parts of the extension portion EP.

The coil unit CLP may be disposed to be separated from the heat dissipation unit HDP. For example, the extension portion EP and the first end EP_E1 of the extension portion EP may be arranged to be separated from the heat dissipation unit HDP. As shown in FIG. 8, a gap may be formed between the extension portion EP and the heat dissipation unit HDP and between the first end EP_E1 of the extension portion EP and the heat dissipation unit HDP in a cross-sectional view. The heat dissipation unit HDP may be disposed to be electrically insulated from the coil unit CLP. In some embodiments of the present disclosure, the gap may be filled with an insulating material, but the present disclosure is not limited thereto.

Referring to FIGS. 6 to 8, the display device 1 may further include a first conductive adhesive part CAD1 and a second conductive adhesive part CAD2 arranged on the bottom surface of the printed circuit board FB.

As shown in FIG. 7, when the printed circuit board FB is disposed on the bottom surface of the metal sheet layer MS to overlap the metal sheet layer MS, the first conductive adhesive part CAD1 and the second conductive adhesive part CAD2 may be interposed between the printed circuit board FB and the metal sheet layer MS. As shown in FIG. 8, the first conductive adhesive part CAD1 may overlap the first coil electrode CP1 in the third direction Z. For example, the first conductive adhesive part CAD1 may directly contact the first coil electrode CP1. Similarly, the second conductive adhesive part CAD2 may overlap the second coil electrode CP2 in the third direction Z.

The first conductive adhesive part CAD1 and the second conductive adhesive part CAD2 may have conductivity and an adhesive property, so that it is possible to bond the printed circuit board FB and the metal sheet layer MS and electrically connect the first coil electrode CP1 and the second coil electrode CP2 to the touch driver TDM. The first and second conductive adhesive parts CAD1 and CAD2 may be, e.g., a conductive tape, but is not limited thereto.

Referring to FIG. 8, the printed circuit board FB may include the base part FB_B, a first via electrode VE1 and a first touch driver connection line TCW1.

As shown in FIGS. 6 to 8, the touch driver TDM may be disposed on the top surface of the base part FB_B. However, the present disclosure is not limited thereto, and the touch driver TDM may be disposed on the bottom surface of the base part FB_B. The touch driver TDM may be electrically connected to the coil unit CLP to apply a current for inducing a magnetic field to the coil unit CLP.

The first via electrode VE1 may penetrate the base part FB_B in the third direction Z. The first via electrode VE1 may electrically connect the first touch driver connection line TCW1 and the first coil electrode CP1.

The first touch driver connection line TCW1 may be disposed on the top surface of the base part FB_B. The top surface of the base part FB_B may be the opposite surface of the bottom surface of the base part FB_B facing the metal sheet layer MS. A first side of the first touch driver connection line TCW1 may be connected to the first via electrode VE1, and a second side of the first touch driver connection line TCW1 may be connected to the touch driver TDM. In other words, the first coil electrode CP1 may be electrically connected to the touch driver TDM by the first via electrode VE1 and the first touch driver connection line TCW1.

The second coil electrode CP2 and touch driver TDM may be connected in a manner that is substantially the same or similar to the manner in which the first coil electrode CP1 and the touch driver TDM are connected. For example, the printed circuit board FB may further include a second touch driver connection line connected to the touch driver TDM and disposed on the bottom surface of the base part FB_B, and a second via electrode penetrating the base part FB_B in the third direction Z and connecting the second coil electrode CP2 to the second touch driver connection line. In other words, the second coil electrode CP2 may be electrically connected to the touch driver TDM by the second via electrode and the second touch driver connection line.

Referring to FIGS. 1 and 6 to 8, the touch driver TDM may apply a current to the coil unit CLP so that the coil unit CLP may generate a magnetic field. An induced current is induced in the inductor L of the electronic pen EPN by the magnetic field generated by the coil unit CLP, and charges are accumulated in the capacitor C of the electronic pen EPN, so that a power for driving the electronic pen EPN may be supplied to the electronic pen EPN.

In the display device 1 according to an embodiment of the present disclosure, the heat dissipation layer HDL and the coil unit CLP are integrally provided, so that a separate member for charging the electronic pen EPN, such as a charging coil sheet, may be omitted. Accordingly, the thickness of the display device 1 may be reduced, and the cost for manufacturing the display device 1 may be reduced.

According to an embodiment of the present disclosure the display device 1 may include: the display panel DP including the active area AA for displaying an image IM and the non-active area NAA adjacent to the active area AA; and a metal sheet layer MS on the display panel DP, wherein the metal sheet layer MS includes: a heat dissipator (e.g., HDP) overlapping the active area AA; and a coil (e.g., CLP) surrounding the heat dissipator and overlapping the non-active area NAA.

Figure 9:
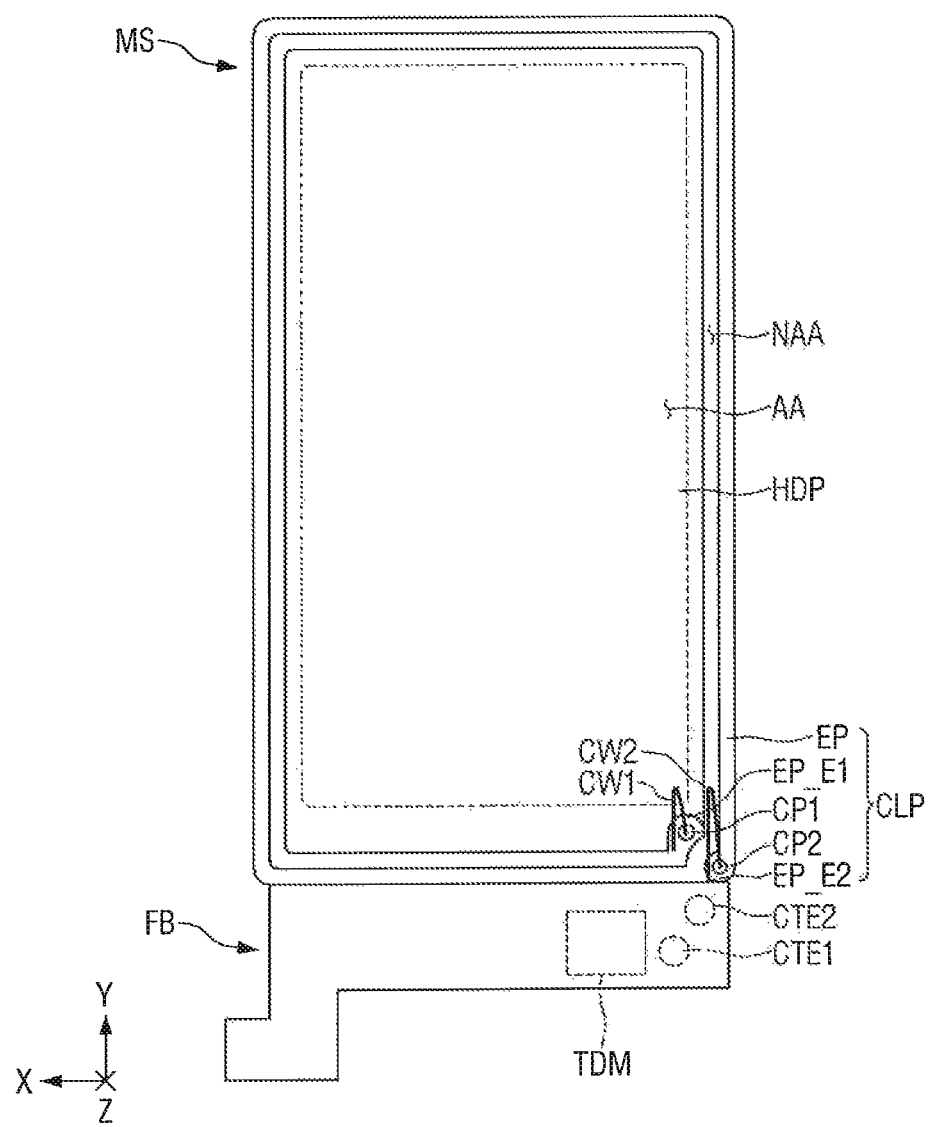
FIG. 9 is a plan view of a metal sheet layer and a printed circuit board according to another embodiment of the present disclosure in a state where the printed circuit board is unfolded.
Figure 10:
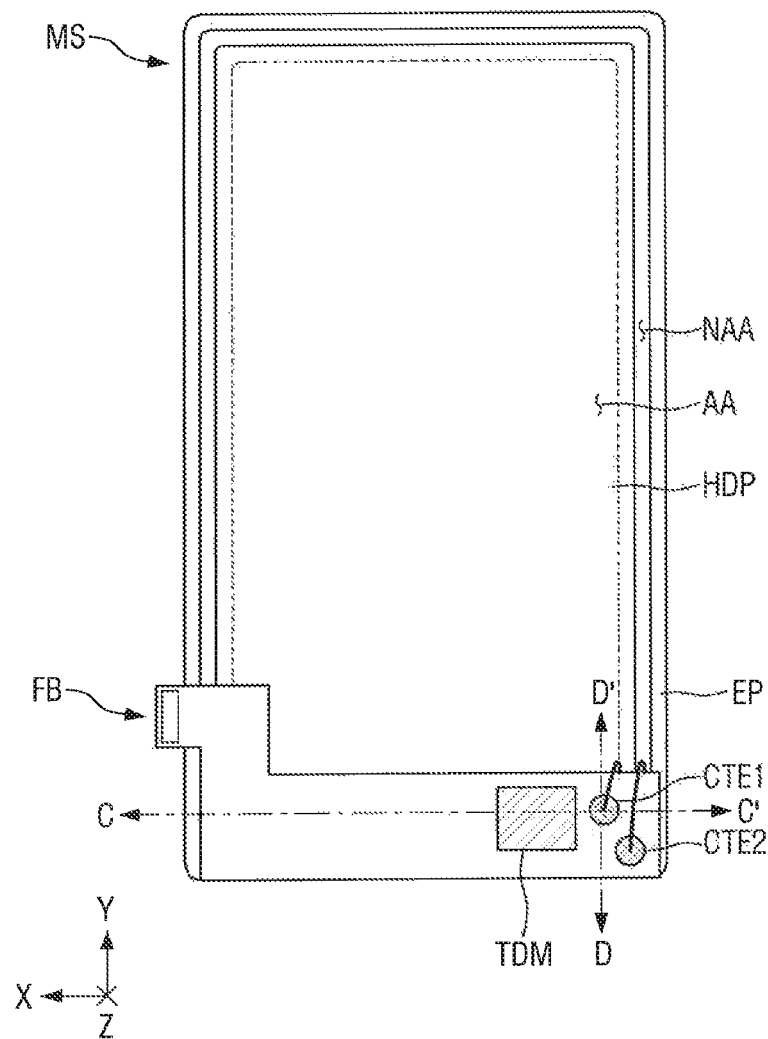
FIG. 10 is a plan view of the metal sheet layer and the printed circuit board according to another embodiment of the present disclosure in a state where the printed circuit board overlaps the metal sheet layer.
Figure 11:
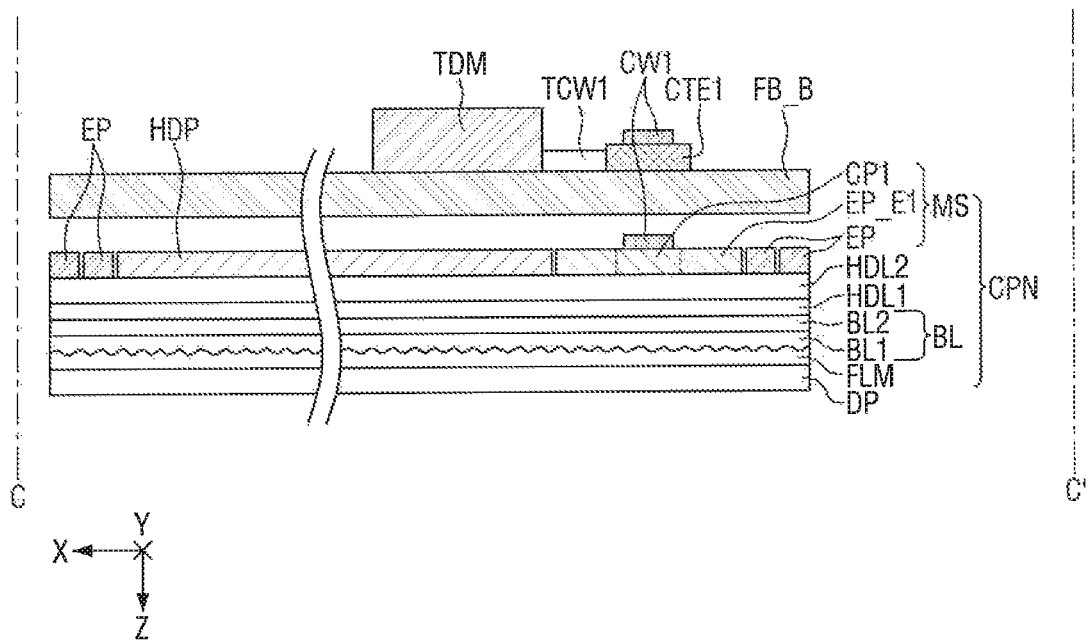
FIG. 11 is a cross-sectional view taken along line C-C' of FIG. 10.
Figure 12:
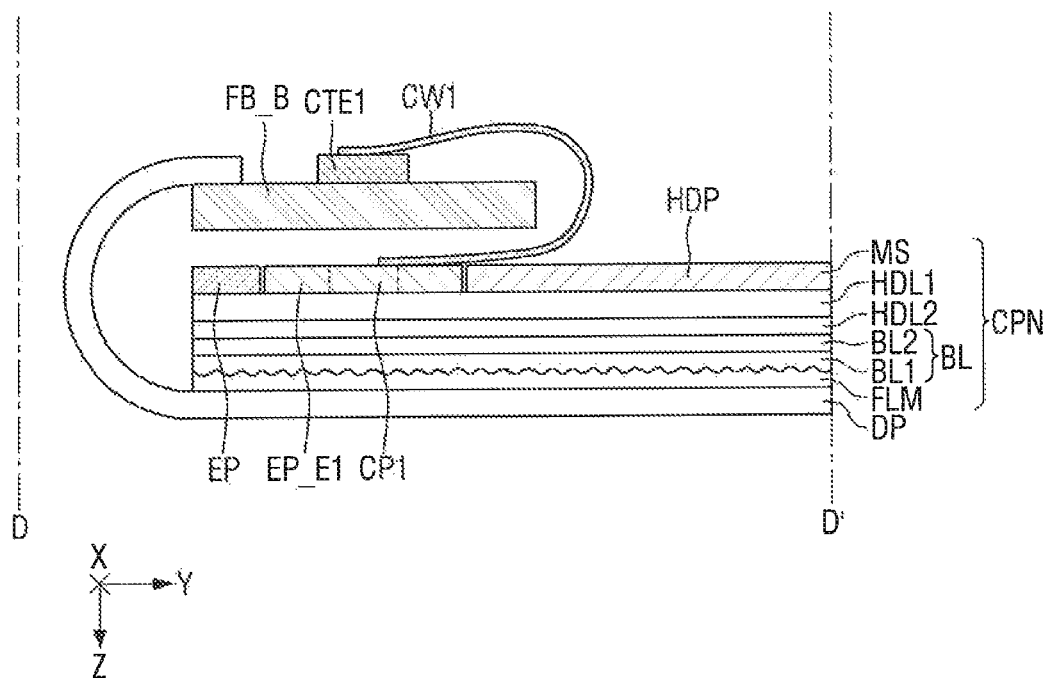
FIG. 12 is across-sectional view taken along line D-D' of FIG. 10.

FIG. 9 is a plan view of a metal sheet layer and a printed circuit board according to another embodiment of the present disclosure in a state where the printed circuit board is unfolded. FIG. 10 is a plan view of the metal sheet layer and the printed circuit board according to another embodiment of the present disclosure in a state where the printed circuit board overlaps the metal sheet layer. FIG. 11 is a cross-sectional view taken along line C-C' of FIG. 10. FIG. 12 is a cross-sectional view taken along line D-D' of FIG. 10.

The embodiment of FIGS. 9 to 12 is mainly different from the embodiment of FIGS. 1 to 8 in a method of electrically connecting the touch driver TDM to the coil unit CLP.

Referring to FIGS. 9 to 12, the display device 1 may further include a first connection line CW1 and a second connection line CW2 that electrically connect the coil unit CLP to the touch driver TDM. In this case, the first via electrode VE1, the second via electrode, the first conductive adhesive part CAD1, and the second conductive adhesive part CAD2 may be omitted.

The first connection line CW1 may connect the first coil electrode CP1 and the touch driver TDM. A first end of the first connection line CW1 may be connected to the first coil electrode CP1, and a second end of the first connection line CW1 may be connected to a first touch driver connection electrode CTE1 to be described later.

The second connection line CW2 may connect the second coil electrode CP2 to the touch driver TDM. A first end of the second connection line CW2 may be connected to the second coil electrode CP2, and a second end of the second connection line CW2 may be connected to a second touch driver connection electrode CTE2 to be described later.

The printed circuit board FB may further include the first touch driver connection electrode CTE1 and the second touch driver connection electrode CTE2.

The first touch driver connection electrode CTE1 and the second touch driver connection electrode CTE2 may be arranged on the top surface of the base part FB_B. As shown in FIGS. 9 and 10, when the printed circuit board FB overlaps the metal sheet layer MS, the first touch driver connection electrode CTE1 and the second touch driver connection electrode CTE2 may be arranged to overlap the first coil electrode CP1 and the second coil electrode CP2 in the third direction Z, respectively, but the present disclosure is not limited thereto.

Referring to FIGS. 10 and 12, the first connection line CW1 and the second connection line CW2 may be connected to the first touch driver connection electrode CTE1 and the second touch driver connection electrode CTE2, respectively, while bypassing the base part FB_B of the printed circuit board FB. In other words, the first connection line CW1 and the second connection line CW2 may not be in direct contact with the base part FB_B of the printed circuit board FB.

As shown in FIG. 12, the first connection line CW1 may be disposed to surround the edge of the base part FB_B in a cross-sectional view. The first connection line CW1 may be disposed to surround a part of the top surface of the base part FB_B, a part of the bottom surface of the base part FB_B, and a side surface between the top surface and the bottom surface of the base part FB_B. For example, the first connection line CW1 may be bent with a curvature and have a substantially 'C' shape in a cross-sectional view. However, the shape of the first connection line CW1 is not limited thereto.

In FIG. 12, the first connection line CW1 may be disposed to be spaced apart from the edge of the base part FB_B. However, the present disclosure is not limited thereto, and at least a part of the first connection line CW1 may be in contact with the edge of the base part FB_B.

The first connection line CW1 may be disposed to be spaced apart from the heat dissipation unit HDP. The first connection line CW1 may overlap the heat dissipation unit DHDP. The first connection line CW1 may be disposed to be electrically insulated from the heat dissipation unit HDP. Similarly, the second connection line CW2 may be disposed to be spaced apart from the heat dissipation unit HDP and electrically insulated from the heat dissipation unit HDP.

The second connection line CW2 may be disposed in a manner that is substantially the same or similar to the manner in which the first connection line CW1 is disposed in a cross-sectional view. For example, the second connection line CW2 may be disposed to surround a part of the top surface of the base part FB_B, a part of the bottom surface of the base part FB_B, and a side surface between the top surface and the bottom surface of the base part FB_B while bypassing an edge portion of the base part FB_B.

Referring to FIGS. 11 and 12, the first touch driver connection electrode CTE1 may be electrically connected to the touch driver TDM by the first touch driver connection line TCW1. Similarly to the first touch driver connection electrode CTE1, the second touch driver connection electrode CTE2 may be connected to the touch driver TDM by the second touch driver connection line disposed on the base part FB_B.

Since the embodiment of FIGS. 9 to 12 is substantially the same as or similar to the embodiment of FIGS. 1 to 8 except for the method of electrically connecting the touch driver TDM to the coil unit CLP, redundant descriptions have been omitted.

Figure 13:
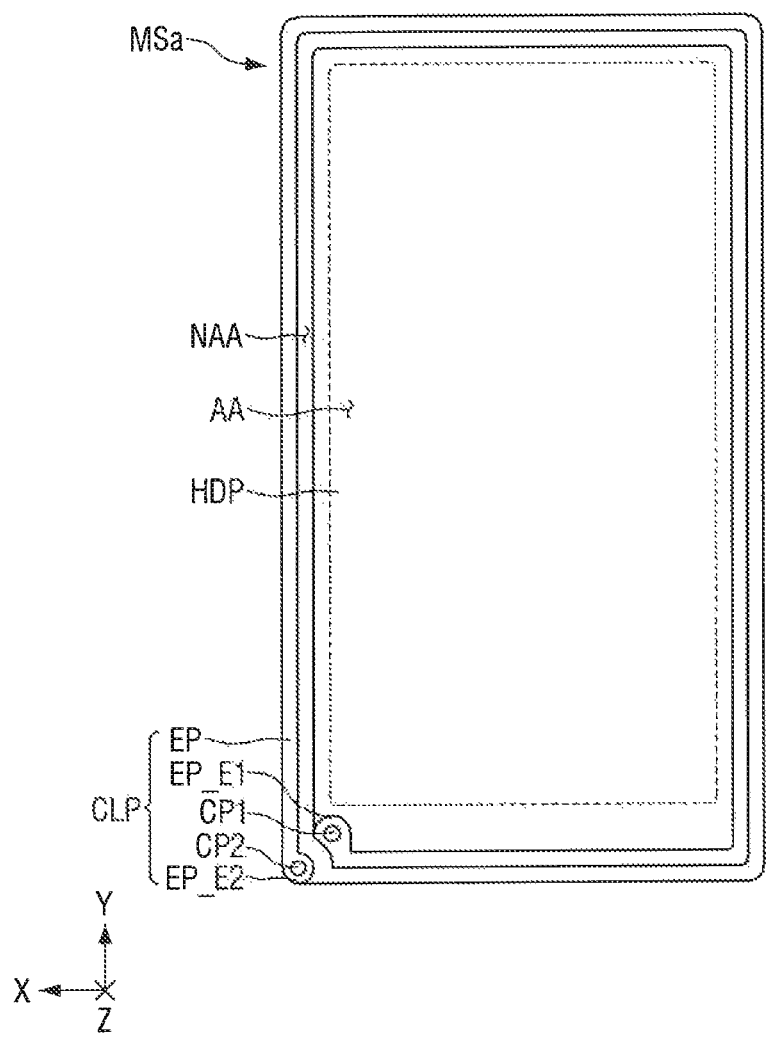
FIG. 13 is a plan view of a metal sheet layer according to still another embodiment of the present disclosure.

FIG. 13 is a plan view of a metal sheet layer according to still another embodiment of the present disclosure.

The embodiment of FIG. 13 is mainly different from the embodiment of FIGS. 1 to 8 in the positions of the first coil electrode CP1 and the second coil electrode CP2.

Referring to FIG. 13, the first end EP_E1 of the extension portion EP, the second end EP_E2 of the extension portion EP, the first coil electrode CP1, and the second coil electrode CP2 are arranged at a corner portion of a metal sheet layer MSa in a plan view that is different from the corner portion of FIGS. 1 to 8.

For example, the first end EP_E1 of the extension portion EP, the second end EP_E2 of the extension portion EP, the first coil electrode CP1, and the second coil electrode CP2 may be arranged at the corner portion spaced apart from the touch driver TDM, e.g., the lower left corner portion of FIG. 13, between both corner portions located with the short side of the metal sheet layer MSa interposed therebetween.

In another example, the first end EP_E1 of the extension portion EP, the second end EP_E2 of the extension portion EP, the first coil electrode CP1, and the second coil electrode CP2 may be arranged at the corner portion that does not overlap the printed circuit board FB, e.g., the upper left corner portion or the upper right corner portion of FIG. 13, among a plurality of corner portions of the metal sheet layer MSa, or may be arranged adjacent to the long side or the short side between the plurality of corner portions. Further, the first end EP_E1 (and the first coil electrode CP1) of the extension portion EP and the second end EP_E2 (and the second coil electrode CP2) of the extension portion EP may be arranged at different corner portions, respectively.

In the above-described cases, the components electrically connecting the coil unit CLP to the touch driver TDM, such as the first touch connection line, the first via electrode VE1, the first conductive adhesive part, the first connection line CW1, and the like described in FIGS. 6 to 11, may have variable arrangement, lengths, or the like to correspond to the changes in the positions of the first end EP_E1 of the extension portion EP, the second end EP_E2 of the extension portion EP, the first coil electrode CP1, and the second coil electrode CP2.

The embodiment of FIG. 13 is substantially the same as or similar to the embodiment of FIGS. 1 to 8 except for the positions of the first coil electrode CP1 and the second coil electrode CP2, so that redundant descriptions have been omitted.

Figure 14:
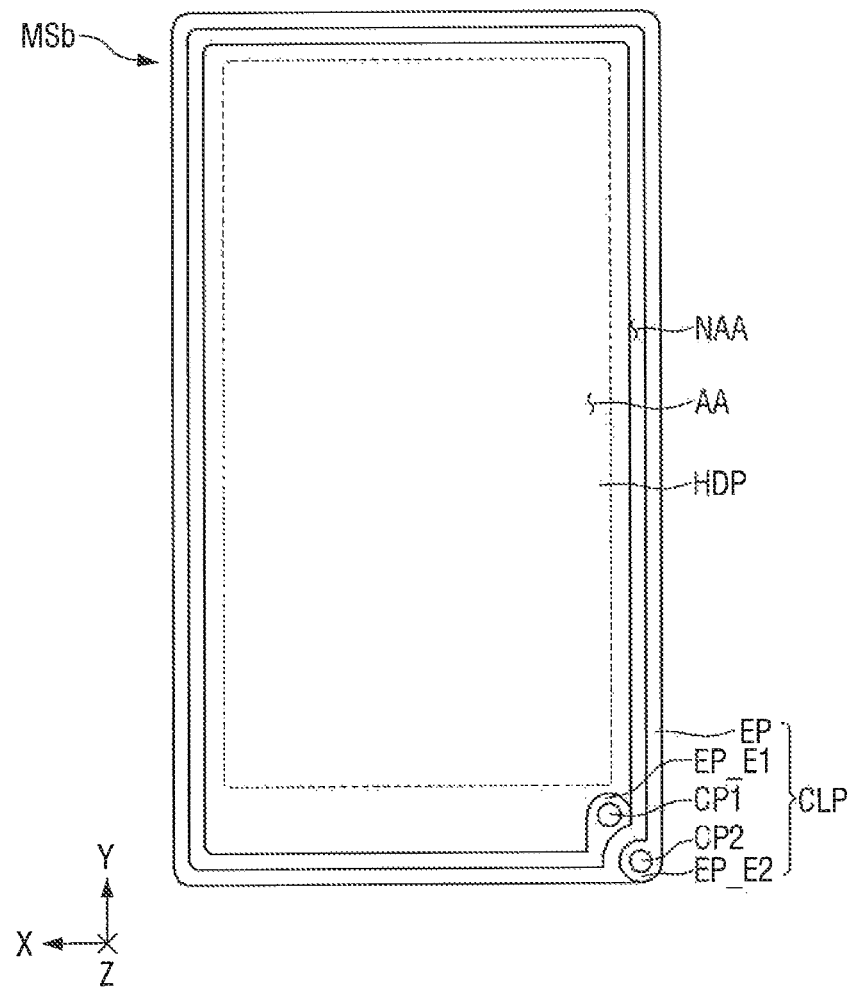
FIG. 14 is a plan view of a metal sheet layer according to still another embodiment of the present disclosure.

FIG. 14 is a plan view of a metal sheet layer according to still another embodiment of the present disclosure.

The embodiment of FIG. 14 is mainly different from the embodiment of FIGS. 1 to 8 in the sizes of the first end EP_E1 of the extension portion EP, the second end EP_E2 of the extension portion EP, the first coil electrode CP1, and the second coil electrode CP2.

Referring to FIG. 14, the sizes of the first end EP_E1 of the extension portion EP and the second end EP_E2 of the extension portion EP of a metal sheet layer MSb may be greater than those of the other parts of the extension portion EP_E2 in a plan view. As illustrated in FIG. 14, the other parts of the extension portion EP may be straight parts extending in the first direction X or the second direction Y along the edge of the heat dissipation unit HDP and corners between the straight parts. The sizes of the first and second ends EP_E1 and EP_E2 may be the width in the first direction X, and the width, the diameter, and/or the area in the second direction Y in a plan view.

For example, the first end EP_E1 of the extension portion EP and the second end EP_E2 of the extension portion EP may have widths greater than the other parts of the extension portion EP. In this case, the diameter of the first coil electrode CP1 and the diameter of the second coil electrode CP2 may be greater than or equal to the widths of the other parts of the extension portion EP. As the sizes of the first coil electrode CP1 and the second coil electrode CP2 increase, the first coil electrode CP1 and the second coil electrode CP2 may be easily connected to the touch driver TDM and/or the component electrically connected thereto. However, the present disclosure is not limited thereto, and the sizes of the first end EP_E1 of the extension portion EP, the second end of the extension portion EP, the first coil electrode CP1, and the second coil electrode CP2 may be smaller than or equal to those of the other parts of the extension portion EP. In other words, the sizes of the first end EP_E1 of the extension portion EP, the second end EP_E2 of the extension portion EP, the first coil electrode CP1, and the second coil electrode CP2 may vary depending on the design of the device 1.

The embodiment of FIG. 14 is substantially the same as or similar to the embodiment of FIGS. 1 to 8 except for the sizes of the first end EP_E1 of the extension portion EP, the second end EP_E2 of the extension portion EP, the first coil electrode CP, and the second coil electrode CP2, so that redundant descriptions have been omitted.

Figure 15:
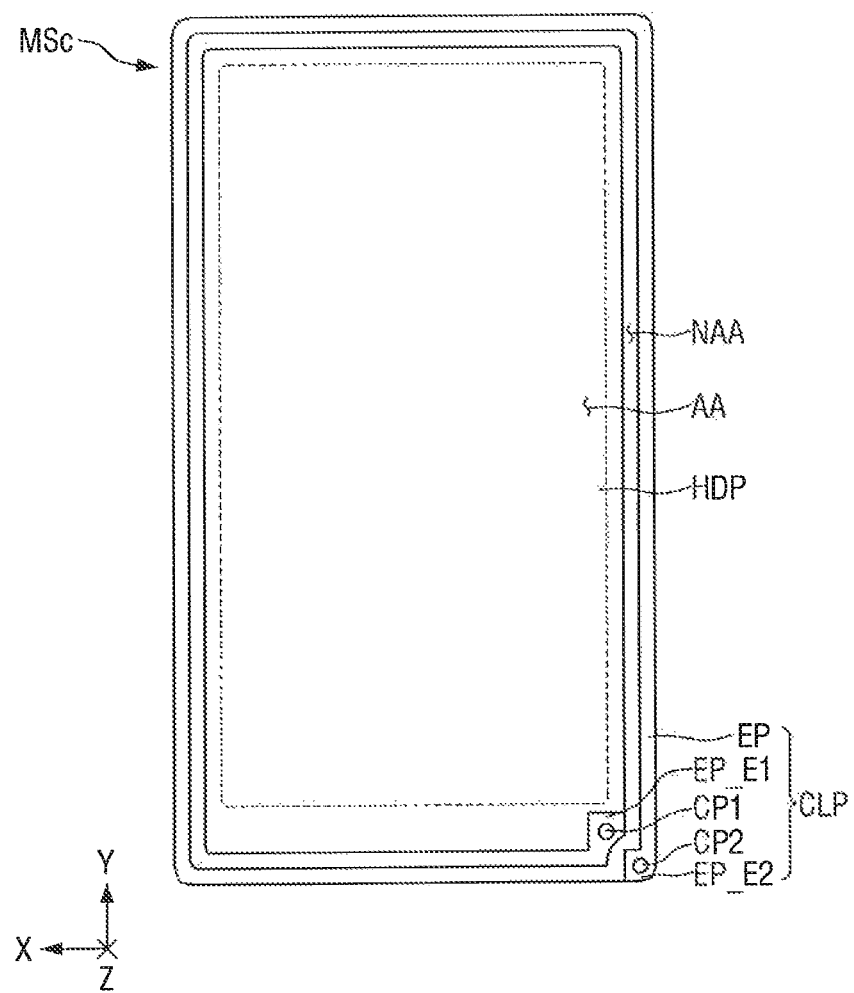
FIG. 15 is a plan view of a metal sheet layer according to still another embodiment of the present disclosure.

FIG. 15 is a plan view of a metal sheet layer according to still another embodiment of the present disclosure.

The embodiment of FIG. 15 is mainly different from the embodiment of FIGS. 1 to 8 in the shapes of the first end EP_E1 of the extension portion EP and the second end EP_E2 of the extension portion EP.

Referring to FIG. 15, the boundary of the first end EP_E1 of the extension portion EP and the boundary of the second end EP_E2 of the extension portion EP of a metal sheet layer MSc may be easily identified from other parts of the extension portion EP because they have distinctive shapes in comparison to the boundaries of the other parts of the extension portion EP. As shown in FIG. 15, the boundary of the first end EP_E1 of the extension portion EP and the boundary of the second end EP_E2 of the extension portion EP may have an angled shape in a plan view, unlike those shown in FIG. 6. In other words, the boundary of the first end EP_E1 of the extension portion EP and the boundary of the second end EP_E2 of the extension portion EP may have the same right angle shape. For example, the boundary of the first end EP_E1 of the extension portion EP and the boundary of the second end EP_E2 of the extension portion EP may be formed at portions where both sides of each of the first and second ends EP_E1 and EP_E2 extending in directions intersecting each other meet. However, the present disclosure is not limited thereto, and the boundary of the first end EP_E1 of the extension portion EP and the boundary of the second end EP_E2 of the extension portion EP may have various shapes such as a circle, an ellipse, a polygon, or the like depending on the design of the display device 1.

The first coil electrode CP1 and the second coil electrode CP2 may have planar shapes different from those of the boundary of the first end EP_E1 of the extension portion EP and the boundary of the second end EP_E2 of the extension portion EP, respectively. As shown in FIG. 15, the first coil electrode CP1 and the second coil electrode CP2 may have a substantially circular shape distinguished from the boundary of the first end EP_E1 of the extension portion EP and the boundary of the second end EP_E2 of the extension portion EP in a plan view. However, the present disclosure is not limited thereto, and the first coil electrode CP1 and the second coil electrode CP2 may have various planar shapes such as a polygon, an ellipse, or the like.

Since the boundary of the first end EP_E1 of the extension portion EP, the boundary of the second end EP_E2 of the extension portion EP, the first coil electrode CP1, and the second coil electrode CP2 have various shapes, it is possible to easily identify the positions thereof and easily connect them.

The embodiment of FIG. 15 is substantially the same as or similar to the embodiment of FIGS. 1 to 8 except for the shapes of the first end EP_E1 of the extension portion EP and the second end EP_E2 of the extension portion EP, so that redundant descriptions have been omitted.

Figure 16:
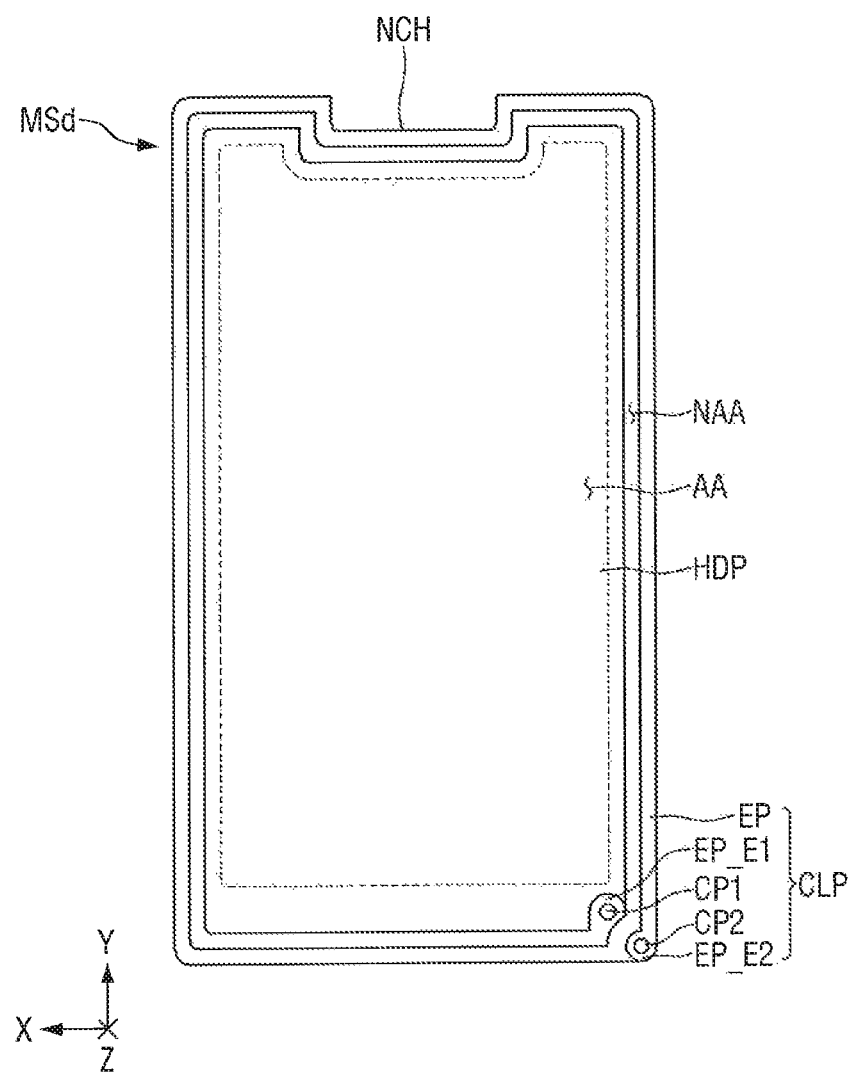
FIG. 16 is a plan view of a metal sheet layer according to still another embodiment of the present disclosure.

FIG. 16 is a plan view of a metal sheet layer according to still another embodiment of the present disclosure.

The embodiment of FIG. 16 is mainly different from the embodiment of FIGS. 1 to 8 in that a notch NCH is formed at a metal sheet layer MSd.

Referring to FIG. 16, the metal sheet layer MSd may further include the notch NCH.

The notch NCH may be disposed on one of both short sides of the metal sheet layer MSd in a plan view, e.g. the short side of the metal sheet layer MSd located on the upper side of FIG. 16, and may be recessed toward the central portion of the metal sheet layer MSd. Referring further to FIG. 7, the short side of the metal sheet layer MSd where the notch NCH is disposed may be the short side that does not overlap the printed circuit board FB in the third direction Z between both short sides of the metal sheet layer MSd.

However, the position where the notch NCH is disposed is not limited thereto, and the notch NCH may be disposed on the long side of the metal sheet layer MSd or may be disposed on the short side of the metal sheet layer MSd that overlaps the printed circuit board FB.

The shapes of the heat dissipation unit HDP and the extension portion EP may vary depending on the shape of the notch NCH. As shown in FIG. 16, the extension portion EP may surround the notch NCH with a relatively constant width in a plan view, but a part of the boundary of the heat dissipation unit HDP adjacent to the notch NCH may be retracted toward the central portion of the heat dissipation unit HDP in a plan view. For example, the notch NCH, a part of the extension portion EP adjacent to the notch NCH, and the boundary of the heat dissipation unit HDP may be arranged to have an approximate 'U' shape in a plan view, but the shapes of the notch NCH and the extension portion EP are not limited thereto.

The embodiment of FIG. 16 is substantially the same as or similar to the embodiment of FIGS. 1 to 8 except that the notch NCH is formed at the metal sheet layer MSd, so that redundant descriptions have been omitted.

What is claimed is:

1. A display device, comprising:
   a display panel including an active area for displaying an image and a non-active area adjacent to the active area; and
   a metal sheet layer on the display panel, wherein the metal sheet layer includes:
   a heat dissipator overlapping the active area; and
   a coil surrounding the heat dissipator and overlapping the non-active area,
   wherein the coil includes:
   an extension portion disposed along a boundary of the heat dissipator;
   a first coil electrode disposed at a first end of the extension portion; and
   a second coil electrode disposed at a second end of the extension portion;
   wherein the first coil electrode and the second coil electrode overlap a printed circuit board.

2. The display device of claim 1, further comprising:
   the printed circuit board connected to the display panel; and
   a touch driver mounted on the printed circuit board.

3. The display device of claim 2, wherein the touch driver is electrically connected to the coil.

4. The display device of claim 3, further comprising a conductive adhesive part interposed between the printed circuit board and the display panel and electrically connecting the touch driver to the coil.

5. The display device of claim 4, wherein the printed circuit board comprises;
   a base part; and
   a via electrode penetrating the base part and electrically connecting the conductive adhesive part to the touch driver.

6. The display device of claim 3, wherein the printed circuit board comprises:
   a base part;
   a touch driver connection electrode on the base part; and
   a connection line electrically connecting the touch driver to the coil.

7. The display device of claim 6, wherein the connection line bypasses an edge of the base part.

8. The display device of claim 2, wherein the touch driver is configured to detect an input from an electronic pen.

9. The display device of claim 8, wherein the touch driver comprises a first touch conductive layer and a second touch conductive layer disposed on the first touch conductive layer, and
   the touch driver is configured to detect an input from an electronic pen based on an induced current induced in the first touch conductive layer or the second touch conductive layer.

10. The display device of claim 8, wherein the touch driver is configured to charge the electronic pen.

11. The display device of claim 1, wherein the first coil electrode and the second coil electrode are disposed at a corner of the metal sheet layer.

12. The display device of claim 11, further comprising a first heat dissipation layer and a second heat dissipation layer disposed between the display panel and the metal sheet layer.

13. The display device of claim 12, wherein the first heat dissipation layer includes polyimide or polyethylene terephthalate.

14. The display device of claim 12, wherein the second heat dissipation layer includes graphite.

15. The display device of claim 12, further comprising a buffer layer disposed between the display panel and the first heat dissipation layer.

16. A display device, comprising:
   a display panel;
   a printed circuit board connected to the display panel and including a touch driver; and
   a heat dissipation part disposed on the display panel,
   wherein the heat dissipation part includes:
   a heat dissipation unit; and
   a coil unit that surrounds the heat dissipation unit and is electrically connected to the touch driver,
   wherein the display device further includes:
   a conductive adhesive part interposed between the printed circuit board and the display panel and electrically connecting the touch driver to the coil unit,
   wherein the printed circuit board comprises:
   a base part; and
   a via electrode penetrating the base part and electrically connecting the conductive adhesive part to the touch driver.

17. A display device, comprising:
   a display panel including a first area for displaying an image and a second area that does not display an image, wherein the second area is adjacent to at least one side of the first area;
   a heat dissipator disposed in the first area; and
   a charging strip disposed in the second area and adjacent to at least one side of the heat dissipator,
   wherein the charging strip includes:
   an extension portion disposed along a boundary of the heat dissipator;
   a first coil electrode disposed at a first end of the extension portion; and
   a second coil electrode disposed at a second end of the extension portion;
   wherein the first coil electrode and the second coil electrode overlap a printed circuit board.

18. The display device of claim 17, wherein the heat dissipator and the charging strip are provided in the same layer.

19. The display device of claim 17, wherein the charging strip is configured to charge an external device.

20. The display device of claim 17, wherein at least one of the first and second coil electrodes is electrically connected to a touch driver of the display device.

21. The display device of claim 17, wherein a gap is provided between the heat dissipator and the charging strip.

* * * * *